United States Patent
Kameda et al.

(10) Patent No.: US 6,817,829 B2
(45) Date of Patent: Nov. 16, 2004

(54) WORK LOADING METHOD FOR AUTOMATIC PALLETIZER, WORK LOADING METHOD, WORK LOADING APPARATUS AND ATTACHMENT REPLACING METHOD THEREOF

(75) Inventors: Shigetaka Kameda, Tatsunokuchi-machi (JP); Kengo Shimizu, Komatsu (JP); Toshiyuki Yoshida, Komatsu (JP); Takashi Moriyasu, Komatsu (JP); Kazuhiko Shiroza, Komatsu (JP)

(73) Assignee: Komatsu Ltd., Tokyo (JP)

( * ) Notice: Subject to any disclaimer, the term of this patent is extended or adjusted under 35 U.S.C. 154(b) by 14 days.

(21) Appl. No.: 10/314,551

(22) Filed: Dec. 9, 2002

(65) Prior Publication Data

US 2003/0118436 A1 Jun. 26, 2003

(30) Foreign Application Priority Data

| Dec. 25, 2001 | (JP) | ........................................ 2001-392872 |
| Jan. 7, 2002 | (JP) | ........................................ 2002-000611 |
| Jan. 7, 2002 | (JP) | ........................................ 2002-000608 |

(51) Int. Cl.[7] .......................... B65G 47/90; B21D 43/22
(52) U.S. Cl. ................ 414/789.6; 414/792.9; 414/802; 414/902; 901/7
(58) Field of Search .......................... 414/789.6, 792.9, 414/799, 802, 902; 901/7

(56) References Cited

U.S. PATENT DOCUMENTS

| 3,608,746 A | * | 9/1971 | Meyer ...................... 414/788.6 |
| 4,180,361 A | * | 12/1979 | Longinotti ............... 414/788.7 |
| 4,738,387 A | * | 4/1988 | Jaufmann et al. ............ 228/4.1 |
| 4,783,904 A | * | 11/1988 | Kimura ........................ 29/786 |
| 4,815,190 A | * | 3/1989 | Haba et al. .................... 29/430 |
| 4,856,701 A | * | 8/1989 | Pockl .......................... 228/6.1 |
| 4,869,935 A | * | 9/1989 | Hayashi et al. .............. 427/421 |
| 4,976,584 A | * | 12/1990 | Focke ....................... 414/789.6 |
| 5,040,056 A | * | 8/1991 | Sager et al. ................... 348/88 |
| 5,098,005 A | * | 3/1992 | Jack ............................. 228/4.1 |
| 5,114,308 A | * | 5/1992 | Smolders et al. ............ 414/799 |
| 5,125,149 A | * | 6/1992 | Inaba et al. ................... 29/430 |
| 5,216,800 A | * | 6/1993 | Nishigori ...................... 29/712 |
| 5,293,322 A | * | 3/1994 | Yagi et al. .................. 700/217 |
| 5,348,440 A | * | 9/1994 | Focke ....................... 414/792.9 |
| 5,385,438 A | * | 1/1995 | Fadaie ........................ 414/810 |
| 5,562,403 A | * | 10/1996 | Winski ........................ 414/799 |
| 5,934,864 A | * | 8/1999 | Lyon et al. .............. 414/791.6 |
| 6,098,268 A | * | 8/2000 | Negre et al. ................... 29/563 |
| 6,283,694 B1 | * | 9/2001 | Spatafora et al. ....... 414/416.05 |
| 6,290,448 B1 | * | 9/2001 | Focke et al. ........... 414/222.01 |
| 6,560,949 B2 | * | 5/2003 | Grams et al. ................. 53/473 |
| 6,626,632 B2 | * | 9/2003 | Guenzi et al. ........... 414/789.6 |

FOREIGN PATENT DOCUMENTS

| JP | 63-115635 A | 5/1988 |
| JP | 2677082 B2 | 7/1997 |
| JP | 3134599 B2 | 12/2000 |

* cited by examiner

*Primary Examiner*—Douglas Hess
(74) *Attorney, Agent, or Firm*—Frishauf, Holtz, Goodman & Chick, P.C.

(57) ABSTRACT

A work loading method and a work loading apparatus with excellent productivity are provided. For this purpose, a work loading method includes the steps of: positioning the work with two centering devices (3a, 3b) every other press shot; and making pairs of two robots (4a, 4d) each, which are located diagonally from each other, out of four of the robots (4a, 4b, 4c, 4d) in total, the two robots of each pair holding the works, which are on two of the centering devices, and performing a loading operation into the pallets, each pair alternately holding the works and performing the loading operation each time two of the centering devices position the works.

12 Claims, 26 Drawing Sheets

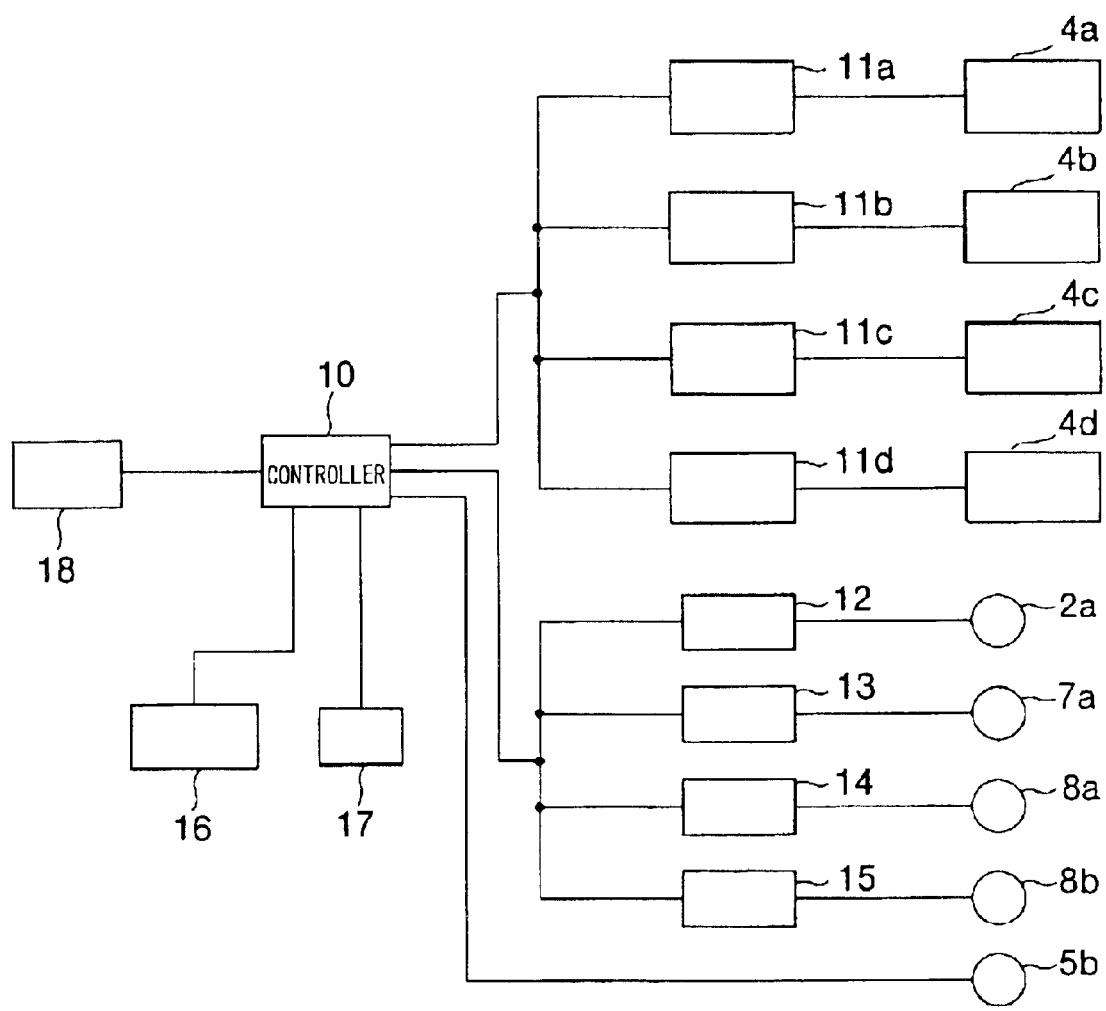
F I G. 2

F I G. 1 1
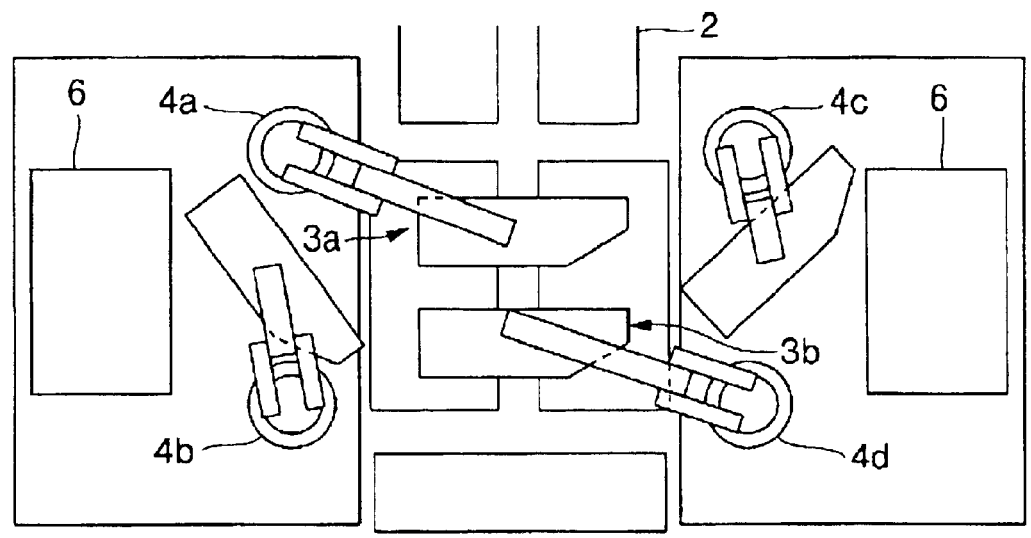
F I G. 1 2
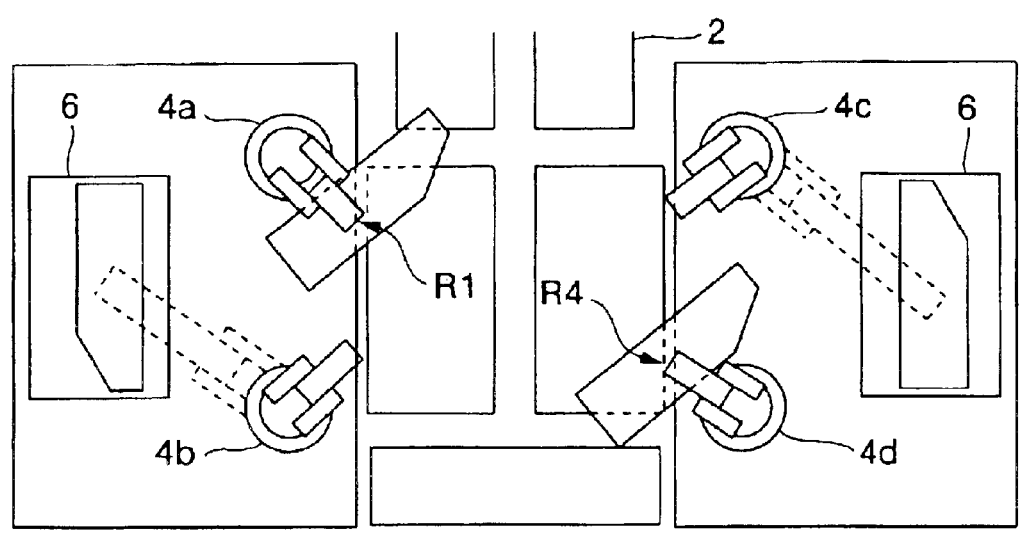

F I G. 1 4
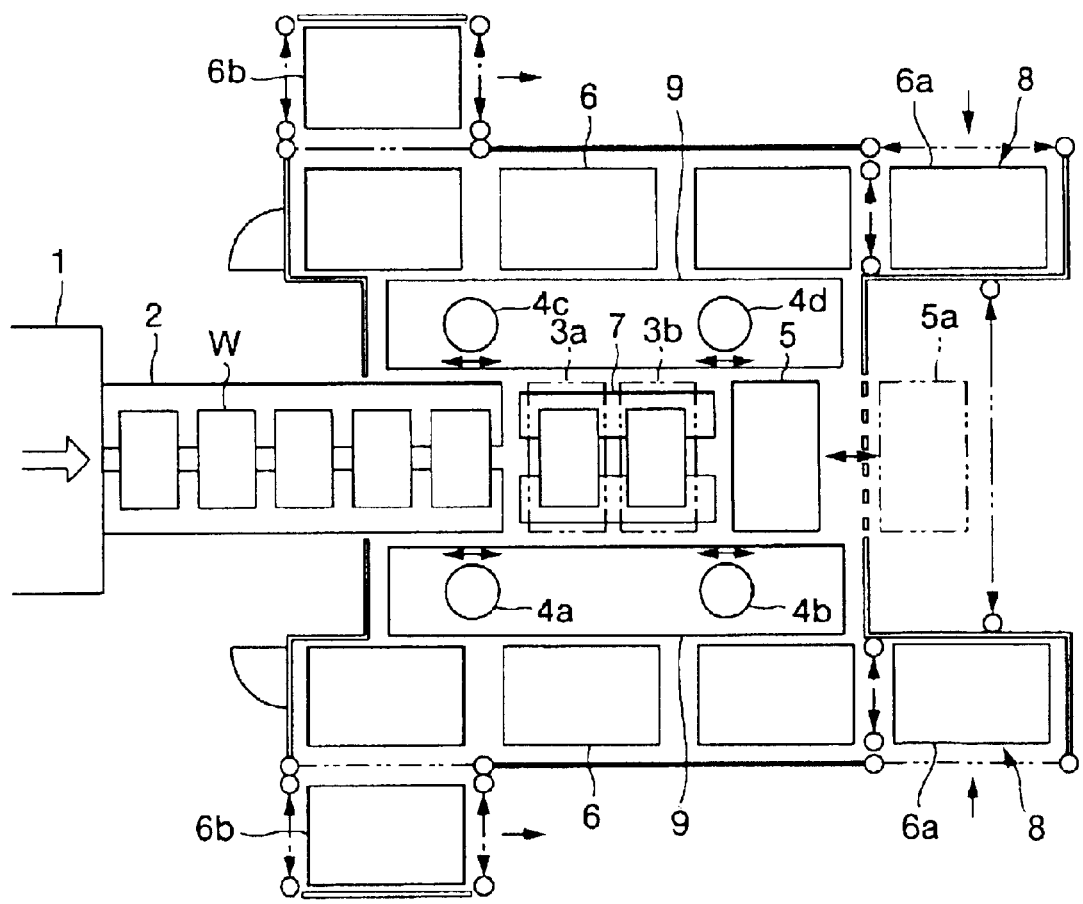

F I G. 1 8
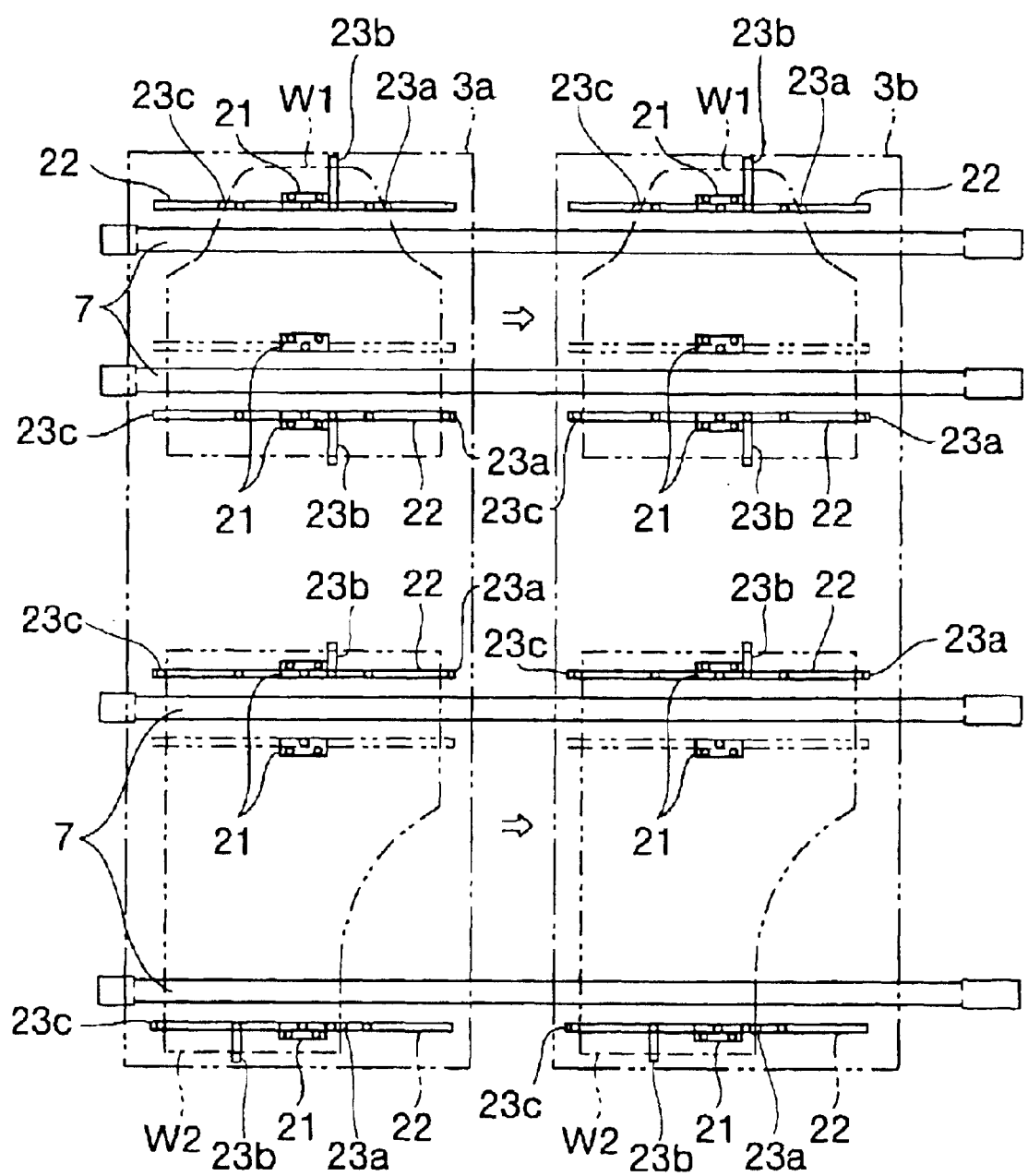

US 6,817,829 B2

WORK LOADING METHOD FOR AUTOMATIC PALLETIZER, WORK LOADING METHOD, WORK LOADING APPARATUS AND ATTACHMENT REPLACING METHOD THEREOF

TECHNICAL FIELD

The present invention relates to a work loading method for an automatic palletizer preferable for reduction in cycle time of press working, a work loading method and a work loading apparatus that are preferable for positioning a work, which is carried out of a press, with a centering device and transferring it to a pallet with a robot and the like, and an attachment replacing method for the work loading apparatus, which is preferable for replacing an attachment for positioning the work and an attachment of a loading robot for holding the work, according to the work.

BACKGROUND ART

An automatic palletizer which is placed at a work carrying-out side of a press line is for automatically holding and transferring a worked work (a panel and the like), which is carried out with a carrying-out conveyor or the like and is positioned with a centering device, and loading it into a pallet to house it therein. Here, as one of important factors to improve cycle time of a press work line, the cycle time of an automatic palletizer is cited. Several automatic palletizer systems are conventionally proposed for this purpose, and for example, the automatic palletizer apparatus disclosed in Japanese Granted Patent No. 3134599 is known. FIG. 36 and FIG. 37 are a plan view and a side view of the automatic palletizer apparatus disclosed in the same patent, and the prior art will be explained below according to FIG. 36 and FIG. 37.

A carrying-out conveyor 154 is provided at a work carrying-out side of a press 152, and a vertically separating conveyor 155 for vertically separating works W is provided at an end portion of the carrying-out conveyor 154 at a downstream side. Conveyors 156 and 157 are respectively provided at an upper and lower carrying-out ports of the vertically separating conveyor 155, and two out of palletizing robots 161a, 161b, 161c and 161d are placed on a left and two on a right in a work transfer direction of each of the conveyors 156 and 157, four palletizing robots in total. Each of the robots 161a to 161d holds and transfers the worked works W, which are positioned by centering devices (not shown) provided at the conveyors 156 and 157, and loads them into a pallet 162 to house them therein.

In the automatic palletizer apparatus disclosed in the above-described Japanese Granted Patent No. 3134599, palletization is performed with a plurality of robots 161a to 161d, and therefore the cycle time can be improved. However, in order to avoid interference between a plurality of robots, they are placed with the large spacing between them in the vertical and horizontal directions. Consequently, a large installation space is required for the automatic palletizer apparatus, thus causing the problem that the entire press line becomes long and the exclusive area of the line occupies a large area in the factory building area. For such a reason, an automatic palletizer apparatus, which can respond to a short cycle time of press working by reducing the installation space for a plurality of robots and eliminating the interference between the robots, is demanded.

Incidentally, when a work such as a panel carried out of the transfer press is loaded into the pallet with use of the robots, cycle time of the devices at the downstream side such as loading robots takes a longer time with respect to the cycle time of the press (press cycle), which becomes an obstacle in the improvement in the cycle time of the entire press working line. As loading devices to solve this problem, the ones that are disclosed in Japanese Granted Patent No. 2677082 and the above-described Japanese Granted Patent No. 3134599 are known.

FIG. 38 is a plan view of a work loading device disclosed in Japanese Granted Patent No. 2677082. A feed bar 70 for carrying out the work W such as a panel that is worked by forming by the transfer press located at the left side of FIG. 38 is provided at the carrying-out side of the press. A transfer conveyor 72, which receives the work W from the feed bar 70 and transfers it to a positioning device 73 in the direction shown by the arrow T in FIG. 38 by intermittent feeding, is provided to penetrate through the positioning device 73. Pallet transfer devices 76 and 77, which carry the pallets 71 in and out of two loading stations 74 and 75 at the upper and lower side of FIG. 38, are placed. Two robots 78 and 79, which alternately hold the work W positioned by the positioning device 73 and load it into pallets 71 located at the aforementioned respective loading stations 74 and 75, are placed between the positioning device 73 and each of the pallet transfer devices 76 and 77, respectively.

According to the above-described constitution, a loading operation is alternately performed by two of the robots 78 and 79 for one of the positioning device 73, and therefore each of the robots 78 and 79 loads the work W for every two shots of the transfer press. Consequently, each of the robots 78 and 79 can move to the next operation while avoiding interference between the robots during the cycle time of each other in order that the cycle time is within two press cycles, whereby the cycle time of the work loading is reduced to make it possible to improve productivity.

However, in the work loading device disclosed in Japanese Granted Patent No. 2677082, two of the robots 78 and 79 perform a loading operation at the same time when the work of transfer press is two-piece working. Consequently, the cycle time of the robots does not catch up with the press cycle, and the cycle time of the entire press working line has to be increased, thus reducing productivity. The two-piece working is to work the works by dividing the works laterally into two in the transfer direction for each one shot of the press.

The aforementioned FIGS. 36 and 37 are also the work loading devices. Namely, the carrying-out conveyors 154 and 154, which are placed side by side laterally in two rows and transfer the works W worked by forming by the press 152 to an inspection station 153, are provided at the press 152. A pair of vertically separating conveyors 155 and 155 on the left and right, which are able to oscillate in an up-and-down direction around an oscillation center O by the operation of a cylinder unit 155a, are provided to be able to receive the works W from the carrying-out conveyors 154 and 154 at the downstream side of the carrying-out conveyors 154 and 154, connectingly to the inspection station 153. A pair of left and right carrier conveyors 156 and 156 at an upper part and a pair of left and right carrier conveyors 157 and 157 at a lower part are provided at the downstream side of the vertically separating conveyors 155 and 155 to be able to receive the works W that are vertically separated at the vertically separating conveyors 155 and 155. The carrier conveyor 157 at the lower side is provided to extend to the downstream side to be longer than the carrier conveyor 156 at the upper side. Further, the respective end portions at the downstream side of the carrier conveyors 156 and 157 form work positioning sections 158, and a positioning lifter 160 for positioning is provided at a lower part of each of the work positioning sections 158. The robots 161a, 161b, 161c and 161d which take out the works W transferred to the respective work positioning sections 158 by the carrier conveyors 156 and 157 and positioned are placed at the side of the respective work positioning sections 158. The pallets 162 and 162 into which the works W are loaded are placed at both sides of each of the robots 161a to 161d.

According to the above-described constitution, the works W that are carried out of the press 152 are alternately separated vertically by the vertically separating conveyors 155 and are transferred to the work positioning sections placed up and down. Consequently, each of the robots 161a to 161d loads the work W every two shots of the press 152. Therefore, by containing the cycle time of each of the robots 161a to 161d within the two press cycles, the cycle time of the entire press work line is reduced to improve productivity.

However, in the above work loading device, the vertically separating conveyors 155 are needed, which complicate the apparatus and increase the cost. The cycle time for carrying the works into the pallets 162 is restricted by an operation time of the vertically separating conveyors 155, thus making it impossible to take advantage of the short cycle time of the robots themselves, and making it difficult to further improve the cycle time of the entire press work line.

Conventionally, when the work such as a panel after worked in a press work line such as a transfer press is loaded into a pallet, the work transferred with a transfer conveyor is positioned by a predetermined guide member (a so-called nest) of a centering device. A work loading apparatus, which holds and transfers the positioned work with the transfer robot and loads the work into the pallet located at a predetermined position so that the work does not fall therefrom, is frequently used. On this occasion, when changing the kind of the works, it is necessary to replace the attachment such as a guide member of the centering device, and the attachment for holding the work such as a suction device of a transfer robot at the same time corresponding to the shape and the size of the work. Consequently, a work loading apparatus provided with a replacement device for these attachments is known.

As the work loading apparatus provided with such a replacement device for the attachments, there is for example, the one disclosed in the above-described Japanese Granted Patent No. 2677082. The aforementioned FIG. 38, and FIG. 39 and FIG. 40 are the work loading apparatus, a side view and a front view of a replacement device for the attachments, which are disclosed in the same patent. Concerning FIG. 38, the positioning device 73, the pallet 71, the robots 78 and 79 are as described in the above.

Further, in FIG. 38, two of attachment delivery devices 81 and 82 of the same specification are placed along the transfer conveyor 72 between the transfer conveyor 72, and two of the pallet transfer devices 76 and 77, respectively. Out of them, the attachment delivery device 81 on the upper side of FIG. 38 is in charge of delivery of each attachment for the positioning device 73 located at the side of the robot 78 and an attachment for the robot 78. The attachment delivery device 82 on the lower side is in charge of delivery of each attachment for the positioning device 73 located at the side of the robot 79 and an attachment for the robot 79. Two of the attachment delivery devices 81 and 82 are provided with a supply moving stand 85 as a first moving stand which holds an attachment supply part 84 at a low position and a receiving moving stand 87 as a second moving stand which holds an attachment receiving part 86 at a high position to be movable back and forth along a common guide rail (not shown), on a base stand 83 extending from an area near a base part of each of the robots 78 and 79 to a tip of a terminal end portion of the transfer conveyor 72 in parallel with the transfer conveyor 72. The attachment supply part 84 and the attachment receiving part 86 can hold a lifter attachment 88 and a side guide attachment 89 for the positioning device 73, and a robot attachment 90.

According to the above-constitution, an operation of loading the work W into the pallet 71 is alternately performed by two of the robots 78 and 79. When the attachment replacement for the next work is performed, the next attachment to be used is placed on the attachment supply part 84 in the state in which the supply moving stand 85 and the receiving moving stand 87 are in a retreat position. At the time of replacement, the supply moving stand 85 and the receiving moving stand 87 are moved forward together, and the attachment receiving part 86 and the attachment supply part 84 are placed by laying one over the other at a position within the operation range of the robots. Next, the used attachments 88 and 89 of the positioning device 73 and the attachments 90 of the robots themselves are placed on the attachment receiving part 86 with two of the robots 78 and 79. Subsequently, only the receiving moving stand 87 is retreated, and the attachment receiving parts 86 are located outside the operation range of the robots 78 and 79. Thereafter, the next attachments to be used, which are placed on the attachment supply parts 84 of the supply moving stands 85, are taken up to mount them to the positioning device 73, and the next attachments to be used which are placed on the attachment supply parts 84 are attached to the robots themselves with the robots 78 and 79. Thereafter, the supply moving stand 85 is retreated to locate the attachment supply part 84 outside the operation range of the robots 78 and 79, and then off-line setup is carried out. As described above, since the attachment receiving part 86 and the attachment supply part 84 are placed by laying one over the other at a position within the operation range of the robots, a planar space used for receiving and supplying the attachments within the operation range of the robots can be made extremely small.

However, the attachment replacement device of the work loading apparatus disclosed in the above-described Japanese Granted Patent No. 2677082 is an exclusive device for replacing the attachments, and though the installation space for the device is reduced as compared with the prior art, a predetermined installation space is still necessary. However, the installation space is desired to be as small as possible so that the limited building area of a factory can be effectively used, and further reduction in the space for the entire work loading apparatus is needed. In addition, there are three kinds of attachments, that are, the lifter attachment 88 and the side guide attachment 89 for the positioning device 73, and the robot attachment 90, and these attachments are individually removed and mounted with the robots. Consequently, it takes a long time to mount them, thus causing the problem of reducing operability at the time of setup.

SUMMARY OF THE INVENTION

The present invention is made in view of the above-described problems, and has its object to provide a work loading method of an automatic palletizer which is capable of reducing an installation space for a plurality of robots, and correspond to a short cycle time of press work by eliminating interference between the robots. The present invention has another object to provide a work loading method and work loading apparatus which are capable of reducing a press cycle time with excellent in productivity. The present invention has still another object to provide a work loading apparatus and its attachment replacing method, which require a small installation space and is capable of reducing an attachment replacing time.

In order to attain the above-described object, a first aspect of the work loading method of the automatic palletizer according to the present invention is a work loading method of an automatic palletizer for loading a work, which is carried out of a press, into a pallet by a robot, including the steps of: positioning the works with two centering devices at an upstream side and a downstream side in a work transfer direction every other press shot; and making pairs of two robots each, which are located diagonally from each other, out of four of said robots in total, two of which are on a left and two of which are on a right to oppose each other in the work transfer direction with two of said centering devices between them, the two robots of each pair holding the works, which are on two of said centering devices, and performing a loading operation of the works into the pallets, each pair alternately holding the works and performing the loading operation each time two of the centering devices position the works.

According to the above method, the four robots are located at four corners of substantially a rectangle, and therefore the installation space for the robots can be reduced. Since each pair at the diagonal positions is alternately operated, the robots can be operated without interfering with each other even at a place where interference easily occurs above the centering device or above the pallet even if the distance between the robots is small. Accordingly, the four robots can operate with each standby time being reduced, and therefore the cycle time can be dramatically reduced.

Further, in the work loading method of the automatic palletizer: while the pair of robots are under a holding operation of the works, the other pair of robots may perform a loading operation of the works into the pallets, or may be on standby for entry into the work holding operation position; and while the pair of robots are under the loading operation of the works into the pallets, the other pair of robots may perform the holding operation, or may be on standby for entry into the aforesaid work loading positions It is at the time of the work holding operation above the centering device and at the time of work loading operation above the pallet that the interference between a plurality of robots easily occurs on loading the works. Consequently, in the present method, two pairs are made by pairing two robots, which are located diagonally from each other, and each pair alternatively performs the work holding operation and work loading operation, and therefore the interference between the robots can be prevented with reliability.

Further, the work loading method of the automatic palletizer may further include the step of: on performing work loading into the pallet, outputting an interference area entry interlock signal of the each robot to an upper controller, and confirming interlock of prevention of interference between the robots via the upper controller.

According to the above method, since the interference area interlock signal of each robot is outputted to the upper controller and each interlock signal is monitored via the upper controller, the operation program of the robot is simplified, and can be constituted by a short program. Consequently, creation of the operation program and maintenance are extremely facilitated, and processing arithmetic operation speed is enhanced, and therefore arithmetic operation processing of the servo control processing of the robots can be performed at high speed.

A second aspect of the work loading method of the automatic palletizer according to the present invention is a work loading method of an automatic palletizer for loading a work, which is carried out of a press, into a pallet by a robot, and includes the step of: controlling a loading position of the work based on a number of the works already loaded into the pallet before start of a work loading operation, and a number of works to be loaded into the pallet by the work loading operation.

According to the above method, even when the works are already loaded into the pallet before the start of the work loading operation, the total number of the loaded works are computed based on the number of the works already loaded in the pallet and the number of the works loaded into the pallet by the work loading operation. Based on the arithmetically operated total number of loaded works, the loading position (release position) of the work to be loaded next is obtained, and the robot is controlled to be at the position. Consequently, the works can be also loaded into the short-loaded pallet, and the total number of loaded works can be accurately controlled. As a result, management of the pallet becomes easy, and excellent operability is provided. A teaching operation does not have to be performed at each work loading position in the pallet, and the number of teaching points can be reduced to be smaller than the maximum number of loaded works in each pallet, thus facilitating the teaching operation.

The work loading method according to the present invention includes the steps of: positioning works, which are carried out of a press, with a plurality of centering devices located directly under a downstream of the press or a carrying-out conveyor attached to the press; and taking up the works, which are positioned by the plurality of centering devices every plurality of press cycles, to load them into pallets by a plurality of pairs of loading robots.

A first aspect of the work loading apparatus according to the present invention is a work loading apparatus for loading a work, which is carried out of a press, into a pallet and includes: a plurality of centering devices which are located directly under a downstream of the press or a carrying-out conveyor attached to the press; and a plurality of pairs of loading robots for taking up the works positioned by the centering devices to load them into the pallets.

According to the work loading method and the first aspect of the work loading apparatus, the works positioned by a plurality of centering devices every plurality of press cycles are loaded by a plurality of pairs of loading robots, alternately by each pair. Consequently, even when the cycle time of the robots is longer with respect to the press cycle, (for example, about twice), the loading operation of the works of a plurality of cycles, which are worked every plurality of press cycles, can be processed. Consequently, the press working line with a short cycle time (good productivity) making the most of the working speed of the press can be constructed.

When the press performs single-piece working (namely, one work is worked per one shot of the press 1), the loading robots made pairs each corresponding to the centering devices take up the works every press cycles, alternately by each pair. When the press performs two-piece working, the loading robots made pairs each corresponding to the centering devices take up the works at the same time every plurality of cycles. As a result of these, the press work line with high general versatility, which can correspond to the case of single-piece working and in the case of two-piece working, can be constructed. Further, since the centering devices are placed directly under the downstream of the press or the carrying-out conveyor, the press cycle time can be shortened without being influenced by the cycle time of the separating device at the midpoint used in the prior art and the like, and the press work line can be built in the compact space.

Further in the work loading apparatus, it is preferable that the loading robots are movable in substantially a horizontal direction along substantially a work transfer direction. According to the constitution, the robots having the possibility of interference can move in the direction to be away from each other, and interference prevention can be easily achieved. As a result that the robots move close to the centering devices and take up the works, the operation stroke of the robots can be made shorter and the cycle time can be reduced. The robots can load the works into the pallets from the desired positions, thus facilitating interference prevention between the work guides provided at the pallets and the robot arms, thus making it possible to provide the work guides of the pallets at the optimal positions.

Further, in the work loading apparatus, it is preferable that the pallets are placed on both sides of the centering devices. According to the constitution, when different kinds of works are produced on the left and the right with two-piece working, different works respectively correspond to and are loaded into the pallets at both sides, and therefore even if the number of the works housed in the pallet differs for each kind of work, each pallet is filled with the works, thus making it possible to enhance the pallet housing efficiency.

A second aspect of the work loading apparatus according to the present invention is a work loading apparatus for positioning a work, which is carried out of a press, with a centering device, and loading the positioned work into a pallet with a robot, including: a pallet feeder which makes the pallets movable between a work loading position within a movable range of the robot and a predetermined position outside the movable range; and any pallet out of the pallets loaded on the pallet feeder houses at least either one of a used attachment for the centering device or a used attachment for the robot; and the pallet, which is the same as or a different from the pallet housing at least either one of the used attachment for the centering device or the used attachment for the robot, houses at least either one of the attachment for the centering device to be used next or the attachment for the robot to be used next.

Further, the attachment replacing method of the work loading apparatus according to the present invention is an attachment replacing method of a work loading apparatus for positioning a work, which is carried out of a press, with a centering device and loading the positioned work into a pallet with a robot, the attachment replacing method being of replacing at least either one of an attachment for the centering device or an attachment for the robot according to the work, includes: a first step of housing at least either one of a used attachment for the centering device or a used attachment for the robot into at lease any one of the pallets loaded on a pallet feeder which makes the pallets movable between a work loading position within a movable range of the robot and a predetermined position outside the movable range; and a second step of attaching at least either one of the attachment for the centering device to be used next or the attachment for the robot to be used next, which is placed on the same pallet as or a different pallet from the pallet housing at least either one of the used attachment for the centering device or the used attachment for the robot, to the centering device itself, or the robot.

According to the second work loading apparatus and its attachment replacing method, the used attachment for the centering device and/or the used attachment for the robot, and the attachment for the centering device and/or the attachment for the robot to be used next are placed on the pallets for the attachment. Then the pallets are transferred with "the pallet feeder for transferring the work loading pallets" conventionally used in the work loading apparatus. Consequently, the exclusive attachment replacing device as in the prior art is not necessary. As a result, the installation space for the exclusive attachment replacing device is not needed, thus making it possible to reduce the installation space for the entire work loading apparatus and reduce the production cost.

Further, in the work loading apparatus: the centering device may include a centering bracket; and a plurality of attachments for the centering device may be attached to the same centering bracket. According to the constitution, a plurality of attachments having the positioning function of the centering device are attached to the same centering bracket. Consequently, the attachments for the same centering device are integrated, and can be attached and detached at one operation, thus providing excellent operability at the time of replacement of the attachments and making it possible to reduce the time required for setup.

BRIEF DESCRIPTION OF THE DRAWINGS

FIG. 2 is a control constitution block diagram according to the first to a third embodiments of the present invention;

FIG. 5 to FIG. 12 are explanatory views of operations of robots according to the first embodiment, FIG. 5 shows each of the robots initially set at an operation home position at a starting time, FIG. 6 shows a state in which a front #1 and rear #2 robots are made to enter a centering interference area, FIG. 7 shows each of the robots after completion of work suction, FIG. 8 shows a state in which the front #1 and the rear #2 robots are moved above pallets, FIG. 9 shows a state in which a front #2 robot is moved above a second centering device and a rear #1 robot is moved above a first centering device, FIG. 10 shows a state in which the front #1 and the rear #2 robots are on standby until centering interference area entry I/L of the front #2 and the rear #1 robots is turned off, FIG. 11 shows a state in which the front #1 and the rear #2 robots are moved above the first and the second centering devices, and FIG. 12 shows a state in which the front #1 and the rear #2 robots are moved to retreat points after completion of panel suction;

FIG. 14 is a block diagram of a press work line according to a second embodiment of the present invention;

FIG. 18 is a plan view of the centering devices according to another mode of the second embodiment;

FIG. 19A shows a state in which each of the robots is in a standby position, FIG. 19B shows a state in which attachments of the front #2 and the rear #1 robots are moved to the centering devices, FIG. 19C shows a state in which the front #2 and the rear #1 robots move the works they hold to the pallets, FIG. 19D shows a state in which the front #1 and the rear #2 robots hold the works by suction, FIG. 19E shows a state in which the front #2 and the rear #1 robots which finish work loading are in a standby position, and FIG. 19F shows a state in which the front #1 and the rear #2 robots move the works they hold to the pallets;

BEST MODE FOR CARRYING OUT THE INVENTION

Preferred embodiments according to the present invention will be explained below with reference to the drawings.

Figure 1:
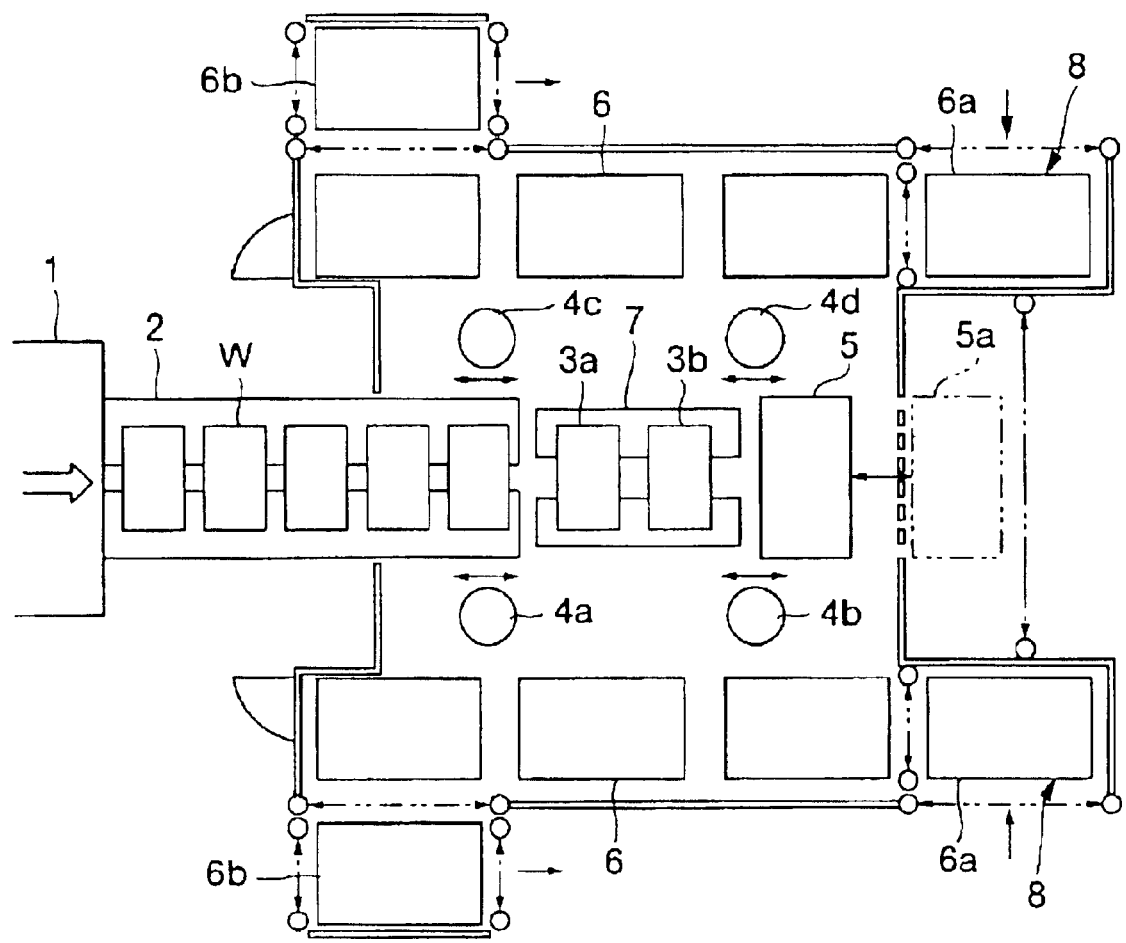
FIG. 1 is a block diagram of a press line to which an automatic palletizer apparatus according to a first embodiment of the present invention is applied.

FIG. 1 is a block diagram of a press work line to which an automatic palletizer apparatus according to a first embodiment of the present invention is applied. In FIG. 1, a carrying-out conveyor 2 is placed at a work carrying-out side of the press 1, and a centering conveyor 7 with a plurality of lines is provided at a downstream side of the carrying-out conveyor 2 in a work transfer direction. The centering conveyor 7 is provided with a first centering device 3a at an upstream side, and a second centering device 3b at the downstream side, and each of the centering devices 3a and 3b includes a positioning device (not shown) for positioning a front and rear and left and right ends in the transfer direction of a work W to be transferred. Four palletizing robots of 4a, 4b, 4c and 4d in total are placed at left and right sides, with two robots at each side, in the transfer direction with the centering devices 3a and 3b between them. A front #1 and a rear #1 robots 4a and 4c are in the vicinity of the first centering device 3a, and a front #2 and a rear #2 robots 4b and 4d are placed in the vicinity of the second centering device 3b. Each of the robots 4a, 4b, 4c and 4d are constituted to be movable in parallel with the work transfer direction.

Further, pallet feeders 8 and 8 for transferring the pallets 6 to be able to be positioned are placed at opposite sides to the centering devices 3a and 3b with the robots 4a and 4b, and the robots 4c and 4d between them, respectively. The pallet 6 is transferred along a guide rail (not shown) from a pallet carrying-in port 6a to a pallet carrying-out port 6b. A sampling carriage 5 is movably provided in the vicinity of an end portion of the centering conveyor at the downstream side to be able to transfer the work W to a sampling inspection position 5a.

Based on a control constitution block diagram shown in FIG. 2, a control constitution of the automatic palletizer apparatus of this embodiment will be explained. A controller (constituted by a programmable logic controller, here) 10 for performing management and control of the entire control system is included. Robot controllers 11a, 11b, 11c and 11d, which control loci and operational sequences of the respective robots 4a to 4d, are connected to the controller 10. The robot controllers 11a to 11d are each connected to a servo motor (not shown) for controlling a drive shaft of each of the robots 4a to 4d and a position sensor (not shown) for detecting a position thereof. The robot controllers 11a to 11d each perform a position servo control based on a deviation value between positional information from the position sensor and a target position on the robot locus previously set so that the deviation value becomes small. At the same time, each of the robot controllers 11a to 11d controls each of the operation sequences of the robots, and transmits and receives an interlock (hereinafter, abbreviated as I/L) signal corresponding to the robot position to and from the controller 10 to prevent interference between the robots 4a to 4d.

A servo amplifier 12 for controlling a carrying-out conveyor servo motor 2a which drives the carrying-out conveyor 2, a servo amplifier 13 for controlling a centering servo motor 7a which drives the centering conveyor 7, servo amplifiers 14 and 15 for controlling pallet feeder servo motors 8a and 8b which drive the pallet feeders 8 and 8, respectively, and an AC motor 5b for driving the sampling carriage 5 are connected to the controller 10. Further, a main operating panel 16 and an auxiliary operating panel 17, which have operation switches, indicators and the like, are connected to the controller 10, and the controller 10 controls switching of operation modes and an individual operation of each appliance and device by inputting signals of switches provided at the operating panels 16 and 17 therein, and controls display of the aforementioned indicators by outputting display signals.

Two of the centering devices 3a and 3b are each provided with a position sensor (not shown) which detects completion of work positioning, that is, completion of centering, and a centering completion signal thereof is inputted into the controller 10.

Figure 3:
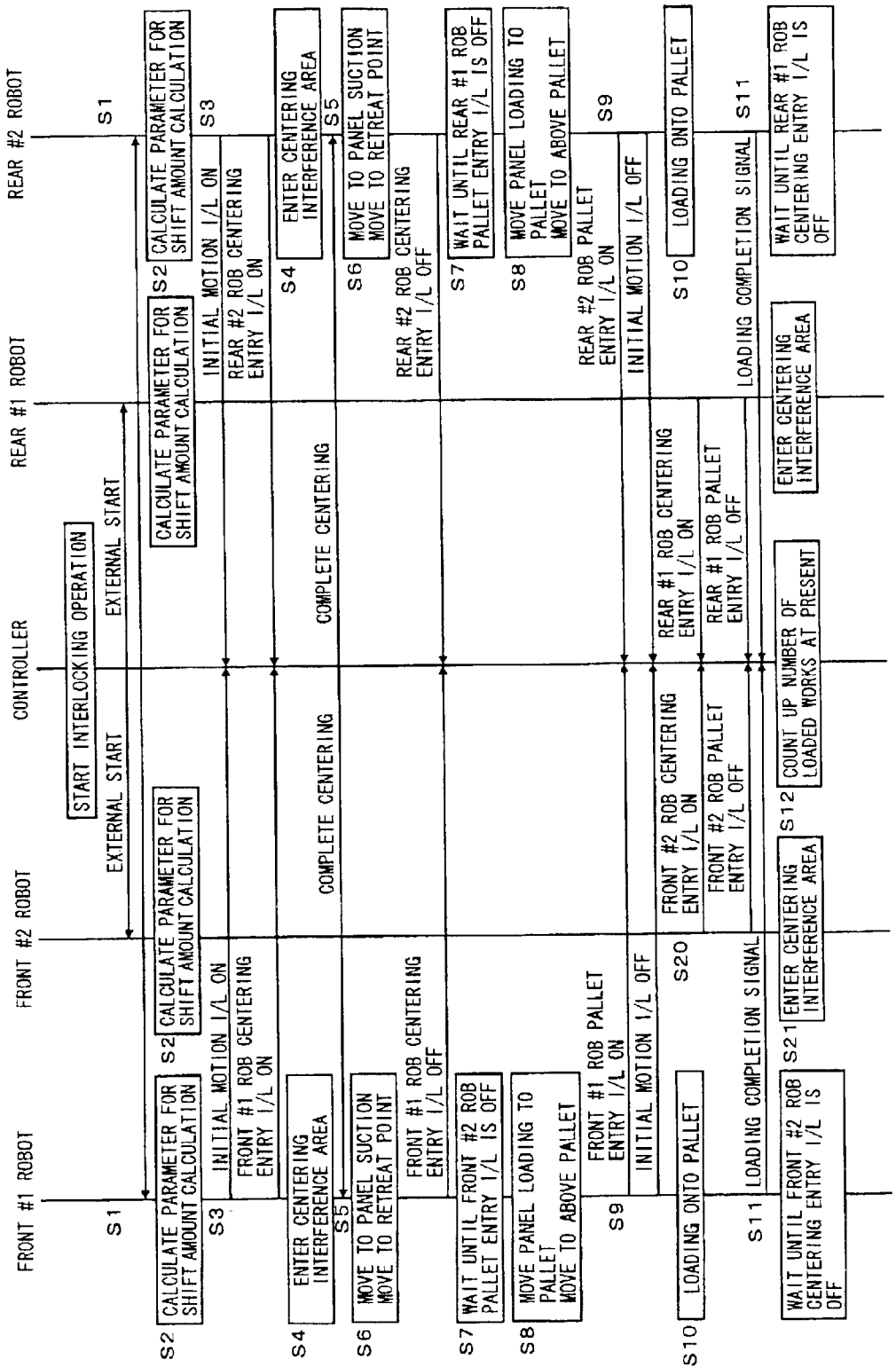
FIG. 3 is a first half of a control sequence diagram according to the first embodiment.
Figure 4:
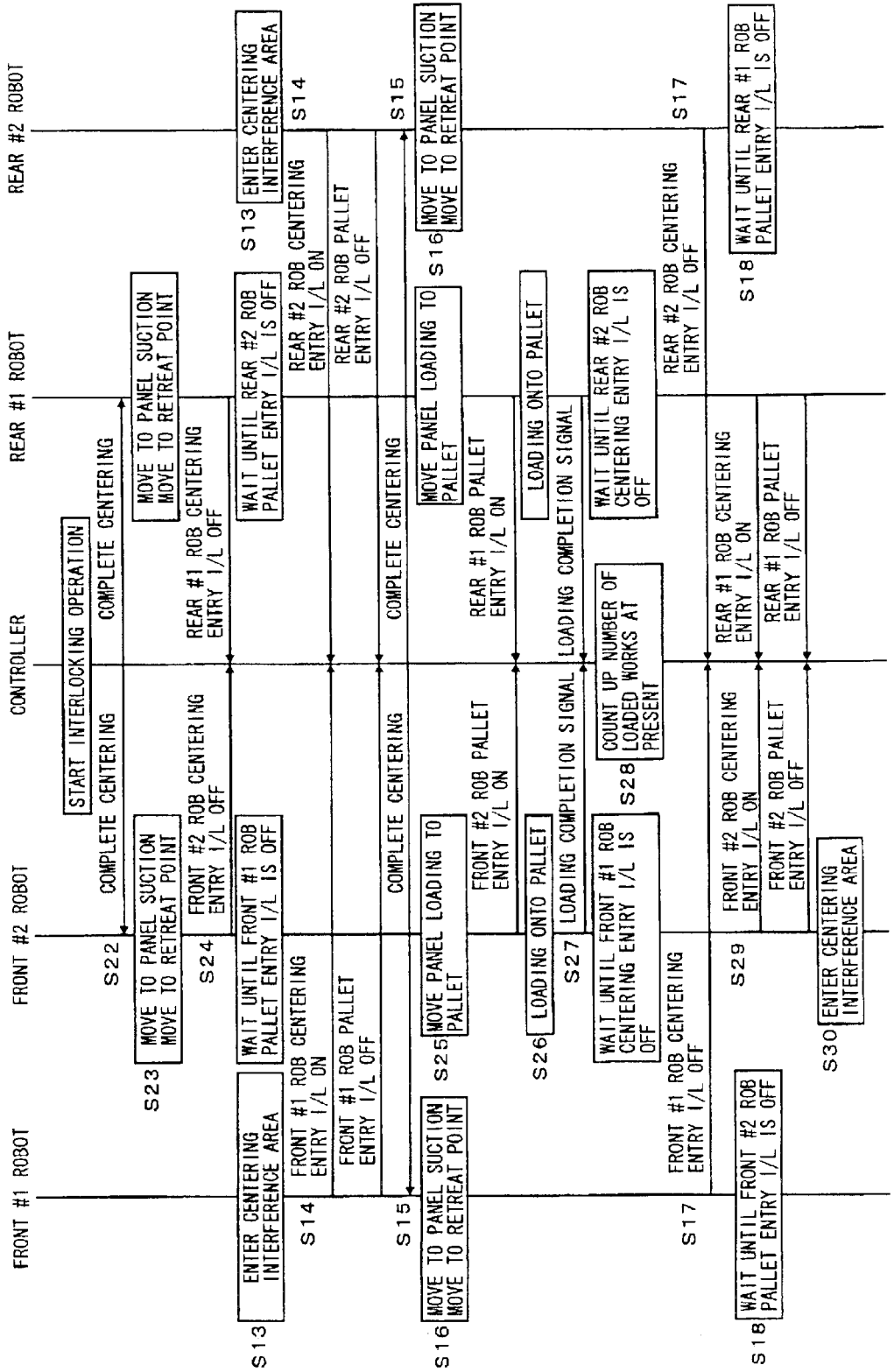
FIG. 4 is a latter half of the control sequence diagram according to the first embodiment.

Next, based on FIG. 3 and FIG. 4, with reference to FIG. 5 to FIG. 12, a control procedure of the automatic palletizer apparatus in the work loading method according to the first embodiment will be explained. FIG. 3 and FIG. 4 are control sequence diagrams, and FIG. 5 to FIG. 12 are operation explanatory diagrams of the robots of the control sequences thereof.

Figure 5:
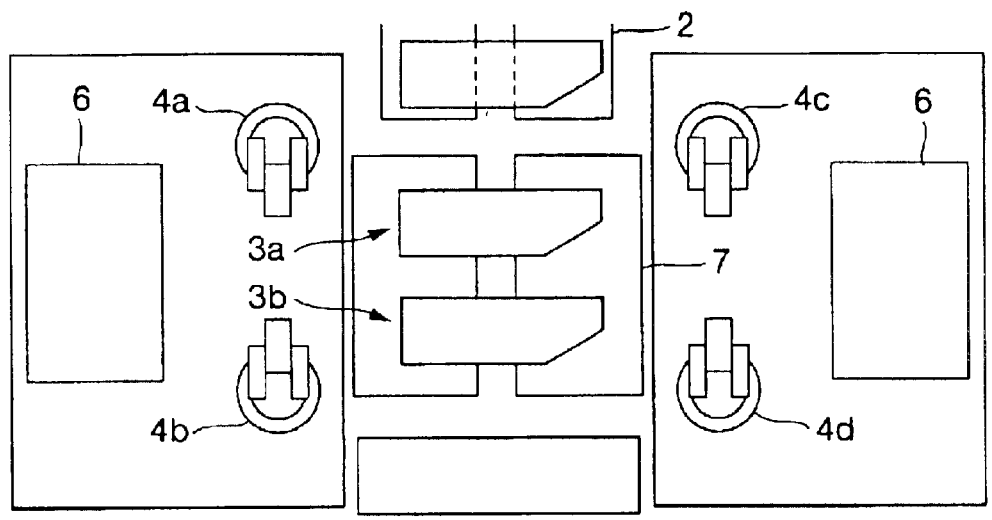

Here, each of the robots 4a, 4b, 4c and 4d is initially set at an operation home position as shown in FIG. 5 at a start of a interlock operation. When the operation is started at the operation home position, the front #1 and the rear #2 robots 4a and 4d, which are diagonally located from each other, are preferentially and initially moved to a suction position. The postures at the operation home position are set so that the arms of the robots 4a, 4b, 3c and 4d do not interfere with each other. As areas in which four of the robots 4a to 4d interfere with each other with a high possibility, a centering interference area above the first centering device 3a and the second centering device 3b, and pallet interference areas, in which a loading operation to the pallets 6 is performed, are set. The explanation will be made with the example in which a panel is used as the work W below.

Figure 6:
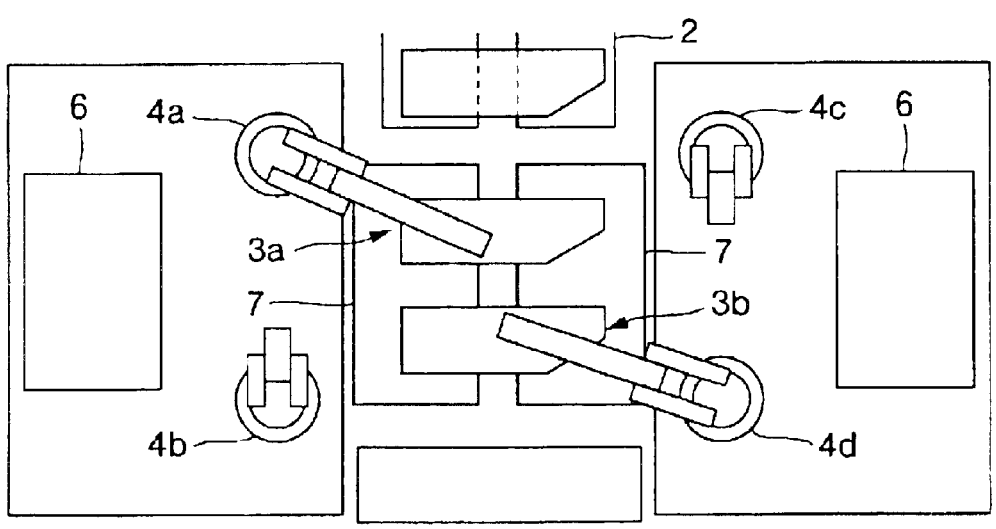

First, in step S1, when a interlock operation starting button (not shown) is operated, the controller 10 outputs an external start signal to each of the robot controllers 11a to 11d. In step S2, the respective robot controllers 11a to 11d of the robots 4a to 4d located at this operation home position receives the above-described external start signal. It shifts operation program to a job according to a panel type, that is, corresponding to die data, and reads out parameters, which are necessary for calculation of a shift amount of the panel loading position at the time of a loading operation to the pallet 6, from the controller 10. Each of the robot controllers 11a to 11d calculates the loading position of the panel to be loaded next based on these parameters, the number of loaded panels which are already loaded at present, and the number of panels to be loaded by this loading operation. Next, in Step S3, the robot controllers 11a and 11d of the front #1 and the rear #2 robots 4a and 4d which are preferentially actuated, output that initial operation I/L is on and centering interference area entry I/L is on to the controller 10. After the output, in step S4, as shown in FIG. 6, the front #1 and the rear #2 robots 4a and 4d are made to enter the centering interference area, and the front #1 robot 4a is moved to above the first centering device 3a, and the rear #2 robot 4d is moved to above the second centering device 3b, respectively. Then, in step S5, the front #1 robot 4a and the rear #2 robot 4d are kept on standby at the positions until the robot controllers 11a and 11d capture the work positioning completion signals, namely, the centering completion signals, of the first and the second centering devices 3a and 3b respectively via the controller 10.

Figure 7:
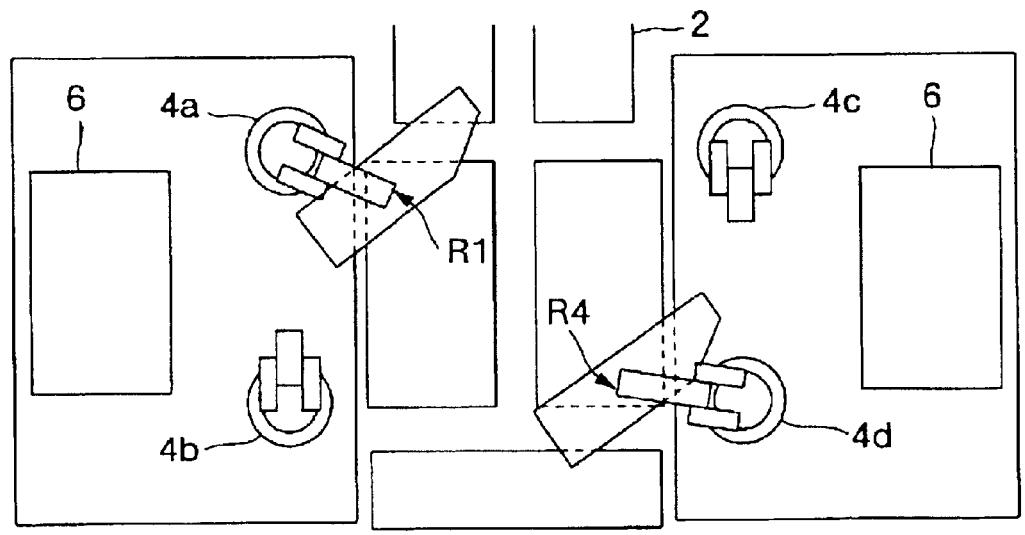
Figure 8:
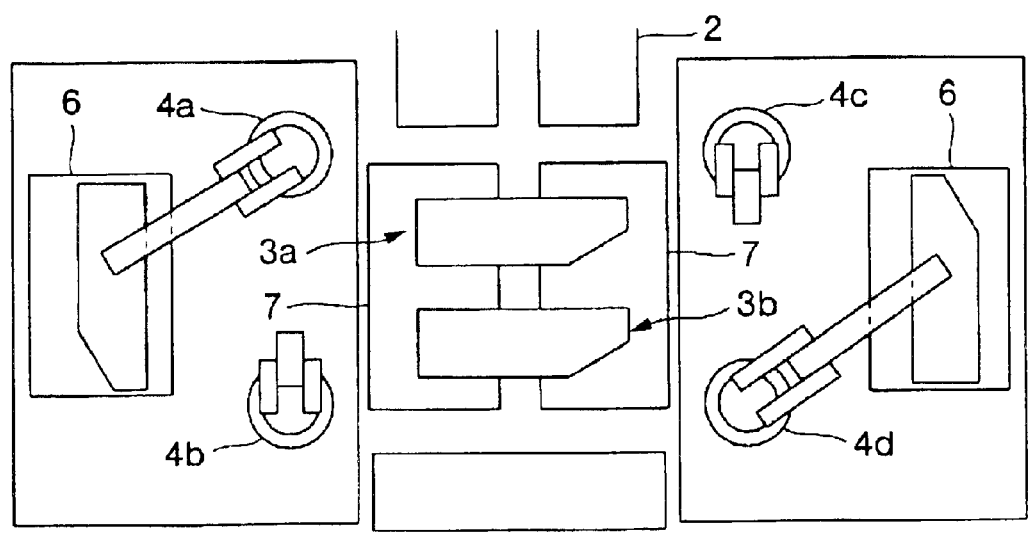

When each of the centering completion signals of the first and the second centering devices 3a and 3b is inputted, the robot controllers 11a and 11d move the front #1 and the rear #2 robots 4a and 4d to the suction positions for the panels to make them perform suction operations, and after the completion of work suction, they move them to retreat points R1 and R4 as shown in FIG. 7. The robot controllers 11a and 11d output the centering interference area entry I/L of the front #1 and the rear #2 robots 4a and 4d being off to the controller 10, at the retraction points R1 and R4. Thereafter, in step S7, the front #1 and the rear #2 robots 4a and 4d are kept on standby until pallet interference area entry I/L of the front #2 and the rear #1 robots 4b and 4c is turned off. At the time of starting the interlock operation, the front #2 and the rear #1 robots 4b and 4c are at the operation home position, and therefore the above-described pallet interference area entry I/L is equivalently regarded as off. Next, in step S8, as shown in FIG. 8, the front #1 and the rear #2 robots 4a and 4d are moved above the pallet 6. Next, in step S9, the pallet interference area entry I/L being on and the initial operation I/L being off of the front #1 and the rear #2 robots are outputted to the controller 10.

Figure 10:
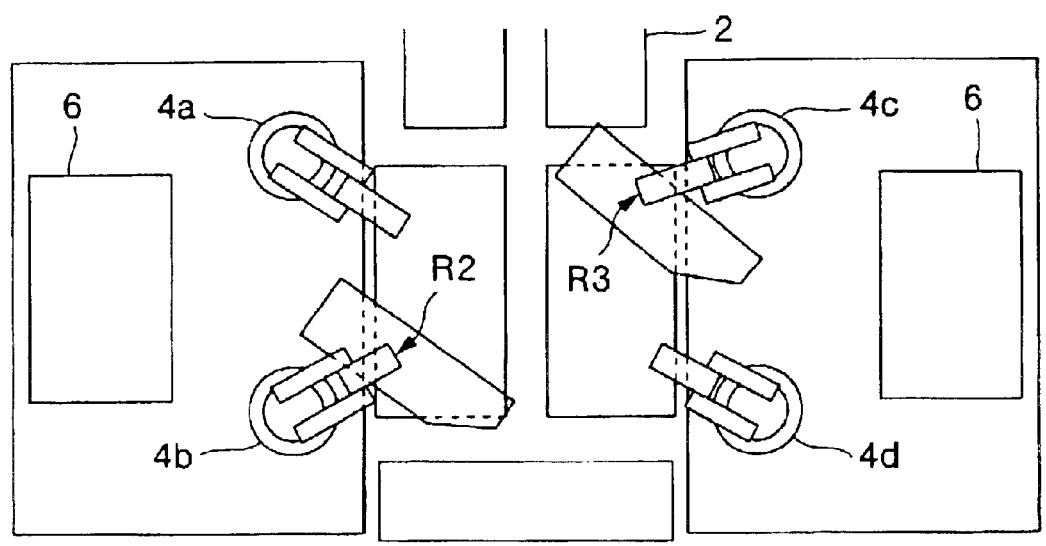

Subsequently, in step S10, the robot controllers 11a and 11d move the front #1 and the rear #2 robots 4a and 4d to the panel loading position found by the aforementioned arithmetic operation and release suction to load the panels into the pallets 6. After the panel loading, they outputs a loading completion signal to the controller 10, in step S11, the front #1 and the rear #2 robots 4a and 4d are kept on standby above the retreat points R1 and R4 in the vicinity of the operation home position as shown in FIG. 10, until the interference area entry I/L of the front #2 and the rear #1 robots 4b and 4c is turned off. In step S12, the controller 10 receives the aforementioned loading completion signals of the front #1 and the rear #2 robots 4a and 4d, and counts up the number of loaded pallets at the present time.

Figure 9:
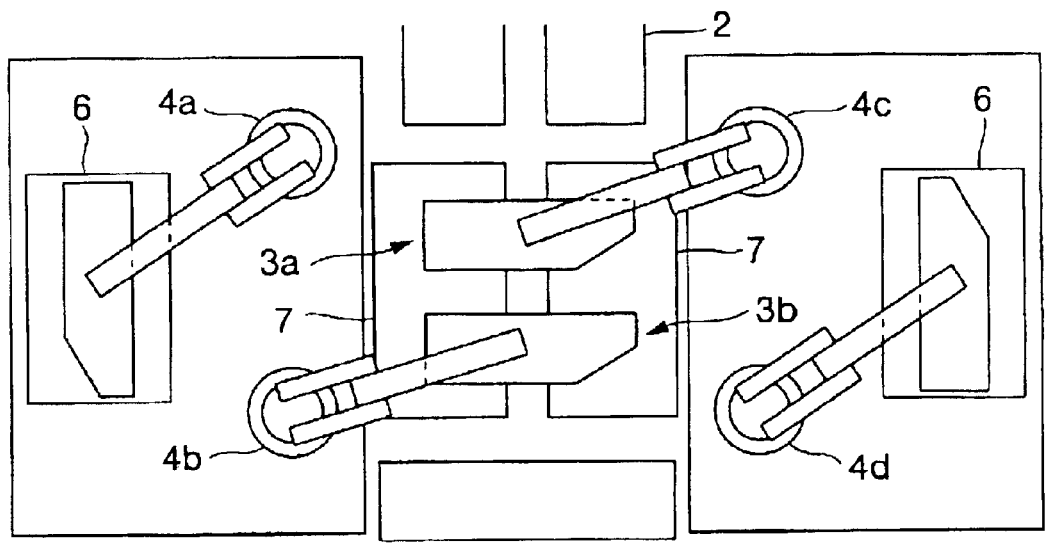

Meanwhile, in step S20, the robot controllers 11b and 1c of the front #2 and the rear #1 robots 4b and 4c kept on standby monitor each status signal in the controller 10, and when they capture the initial operation I/L of the front #1 and the rear #2 robots 4a and 4d being off, which is outputted at the time of step S9, they starts work suction operation of the front #2 and the rear #1 robots 4b and 4c. At this time, the centering interference area entry I/L of the front #1 and the rear #2 robots 4a and 4d is off, and therefore the robot controllers 11b and 11c output the centering interference area entry I/L being on and the pallet interference area entry I/L being off of the front #2 and the rear #1 robots 4b and 4c to the controller 10. In step S21, the front #2 and the rear #1 robots 4b and 4c are made enter the centering interference area, and as shown in FIG. 9, the front #2 robot 4b is moved to above the second centering device 3b and the rear #1 robot 4c is moved to above the first centering device 3a, respectively.

Next, in step S22, the robot controllers 11b and 11c keep the front #2 and the rear #1 robots 4b and 4c at the positions above the second centering device 3b and the first centering device 3a until they capture the centering completion signal of the first and second centering devices 3a and 3b via the status signal of the controller 10. During this time, when the works W are positioned at the first centering device 3a and the second centering device 3b, respectively, and the centering completion signal is inputted, the front #2 and the rear #1 robots 4b and 4c are moved to the suction position of the panels to perform suction operations, and after work suction completion, they are moved to the retreat points R2 and R3 as shown in FIG. 10, in step S23. In step S24, the centering interference area entry I/L being off of the front #2 and the rear #1 robots 4b and 4c is outputted to the controller 10, and the front #2 and the rear #1 robots 4b and 4c are kept on standby until the pallet interference area entry I/L of the front #1 and the rear 2 robots 4a and 4d is turned off.

During this time, when the robot controllers 11a and 11d confirm that the centering interference area entry I/L of the front #2 and the rear #1 robots 4b and 4c is turned off via the controller 10 at the time of step S24, they make the front #1 and the rear #2 robots 4a and 4d enter the centering interference area in step S13. Subsequently, as shown in FIG. 11, the front #1 and the rear #2 robots 4a and 4d are moved to above the first centering device 3a and the second centering device 3b. In step S14, the robot controllers 11a and 11d output the centering interference area entry I/L being on and the pallet interference area entry I/L being off of the front #1 and the rear #2 robots 4a and 4d. Next, they kept the first #1 and the rear #2 robots 4a and 4d at the positions above the centering devices 3a and 3b until they capture the centering completion signal of the first and the second centering devices 3a and 3b in step S15. When the centering completion signal is inputted, the front #1 and the rear #2 robots 4a and 4d are moved to the panel suction position to perform suction operations in step S16, and after completion of panel suction, they are moved to the retreat points R1 and R4 as shown in FIG. 12. Thereafter, in step S17, the centering interference area entry I/L of the front #1 and the rear #2 robots 4a and 3d being turned off is outputted to the controller 10, and in step S18, the front #1 and the rear #2 robots 4a and 4d are kept on standby until the pallet interference area entry I/L of the front #2 and the rear #1 robots 4b and 4c is turned off. Hereinafter, the process steps are repeated as the step S8 and the following steps of the front #1 and the rear #2 robots 4a and 4d.

Meanwhile, when the pallet interference area entry I/L of the front #1 and the rear #2 robots 4a and 4d is turned off in step S14, the robot controllers 11b and 11c of the front #2 and the rear #1 robots 4b and 4c move the front #2 and the rear #1 robots 4b and 4c to above the pallets 6 in step S25 as shown in FIG. 11 and FIG. 12, and it is outputted to the controller 10 that the pallet interference area entry I/L of the front #2 and the rear #1 robots 4b and 4c is turned on. Next, in step S26, the front #2 and the rear #1 robots 4b and 4c are moved to the panel loading positions which are obtained by the aforementioned arithmetic operation and suction is released to load the panels into the pallets 6. Thereafter, in step S27, the loading completion signal is outputted to the controller 10, and the front #2 and the rear #1 robots 4b and 4c are kept on standby above the retreat points R2 and R3 in the vicinity of the operation home position until the centering interference area entry I/L of the front #1 and the rear #2 robots 4a and 4d is turned off. In step S28, the controller 10 receives the loading completion signal of the front #2 and the rear #1 robots 4b and 4c, and counts up the number of loaded pallets at present.

When it is outputted that the centering interference area entry I/L of the front #1 and the rear #2 robots 4a and 4d is turned off at the time of step S17, it is outputted to the controller 10 that the centering interference area entry I/L of the front #2 and the rear #1 robots 4b and 4c is turned on and the pallet interference area entry I/L thereof is turned off, in step S29. Next, in step S30, the front #2 and the rear #1 robots 4b and 4c are made to enter the centering interference area, and as shown in FIG. 9, the front #2 robot 4b and the rear #1 robot 4c are moved to above the second centering device 3b and the first centering device 3a, respectively. Hereinafter, the process steps are repeated as the process of the step S22 and the following steps of the front #2 and the rear #1 robots 4b and 4c.

Figure 13:
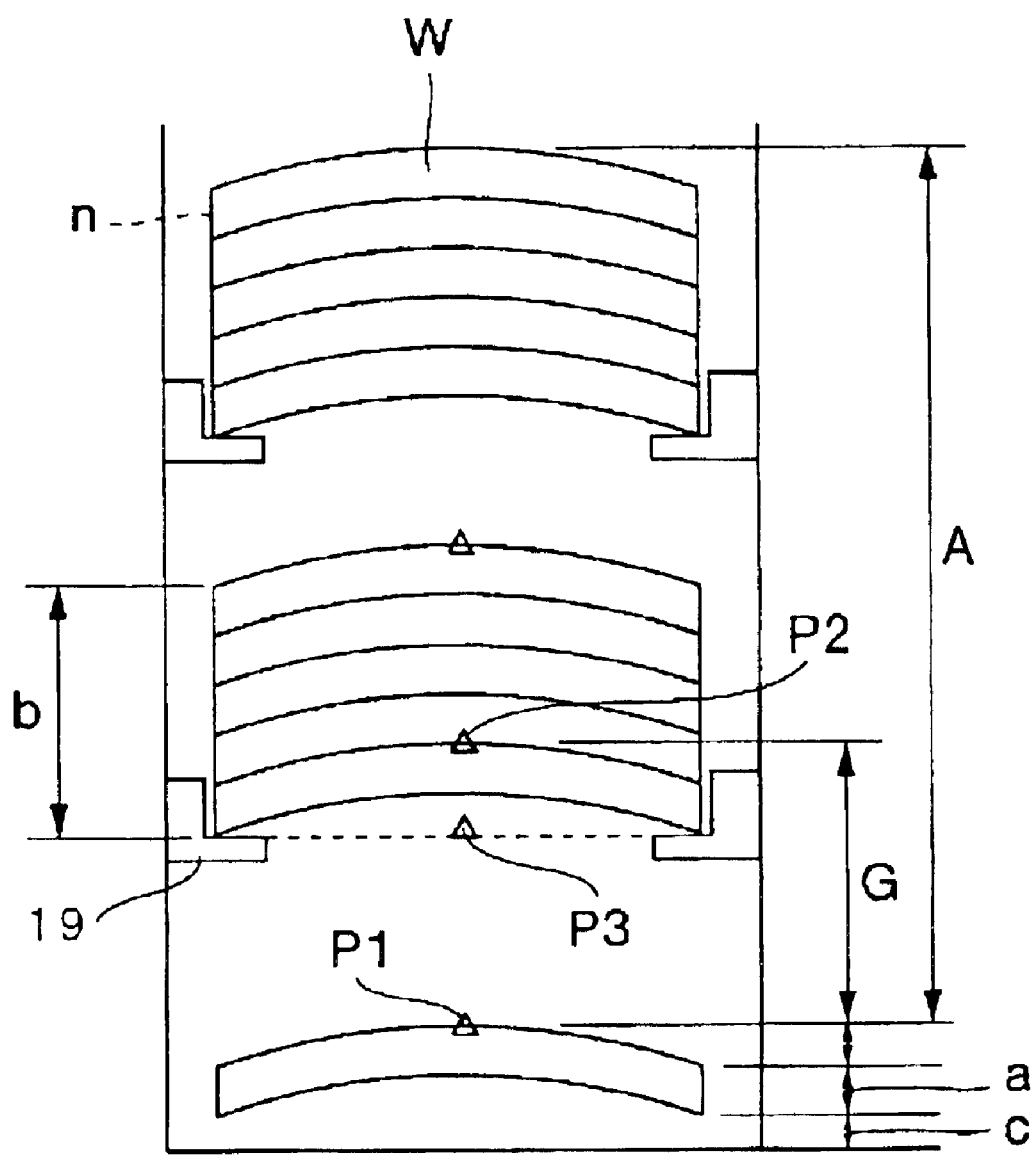
FIG. 13 is an explanatory view of parameters for calculation of a loading position according to the first embodiment.

Next, based on FIG. 13, a calculating method of the loading position of the work W such as a panel into the pallet 6 will be explained. FIG. 13 is a view explaining parameters for calculation of the loading position. The first embodiment adopts a method of successively obtaining a shift amount of the loading position of the panel (panel release position) to be loaded next, with respect to a shift starting reference position, namely, the release position of the first panel, based on the thickness of one panel, and the number of loaded panels.

The release position of the panel to be loaded next, can be obtained from the parameters described below as shown in FIG. 13 if it is known how manieth the panel is, namely, if the number of loaded panels is known.

(a) A release teaching point P1 of the first panel (b) A release teaching point P2 of the first panel after a first hook is raised (note that a clearance c at the time of panel release is the same as the release teaching point P1 of the first panel in the above-description (a))

(c) A first hook raising teaching point P3

(d) A shift amount a per one panel (e) A number of loaded panels n (f) Maximum number of loaded panels b between the hooks Here, the release teaching point P1 is the point at which teaching is made at the first panel release position when the panel is moved to the first panel release position with the clearance c taken into consideration while the panel is being sucked. The release teaching point P2 of the first panel after the hook is raised is a point for teaching the position at which the first panel is released at the first raised hook 19 out of the hooks 19, which are provided to be able to be raised and lowered to support a plurality of panels at predetermined intervals, with the same clearance c as the aforementioned first panel being given as shown in FIG. 13. Further, the first hook raising teaching point P3 is a point for teaching the position at which the first hook 19 is raised to be able to support the panel. These teaching points P1, P2, and P3 are previously taught according to each kind of panel (corresponding to die data), and are stored in an operation program corresponding to each die data of each of the robot controllers 11a, 11b, 11c and 11d.

Further, the shift amount a for each panel and the maximum number b of loaded panels between upper and lower hooks 19 are stored in the controller 10 as parameters corresponding to each die data, and each of the robot controllers 11a, 11b, 11c and 11d reads the above-described parameters corresponding to each die data from the controller 10 before robot drive is started in the interlock operation.

Next, the calculation method is explained in detail.

(1) When the Hook 19 is Never Raised

A shift amount A is obtained from mathematical equation "the shift amount A with respect to the number n of loaded panels=(the shift amount a per one panel)×(the number of loaded panels n)". Then, the shift amount A obtained in the above description is added to the height (Z-axis direction) data of an orthogonal three-dimensional position of the robot at the release teaching point P1 of the first panel, whereby the release position corresponding to the number of loaded panels n can be obtained.

(2) When the Hook 19 is Raised

When "(the release teaching point P2 of the first panel after the first hook is raised)−(the release teaching point P1 of the first panel)=group shift amount G" is set up, "(the first panel release shift amount F after the hook is raised)=(group shift amount G)×(number of raised hooks at present)". The number of loaded panels m on the present raised hood at the highest position of all the raised hooks can be obtained from the mathematical equation "m=(number of loaded panels n)−{(the maximum number of loaded panels b between the hooks)×(the number of raised hooks at present)}. Accordingly, based on the above, the shift amount A with respect to the number of loaded panels n is obtained from the mathematical equation "A=(the first panel release shift amount F after the hook is raised)+{(the number of loaded panels m on the raised hook at present−1)×(the shift amount a per one panel)}".

In the first embodiment, horizontal stacking including horizontally stacking in group is described, but the present invention can cope with vertical stacking including vertically stacking in group, in which panels are loaded upright onto the pallet. In this case, the shift amount A corresponding to the number of loaded panels n is added to the data in the horizontal direction of the orthogonal three-dimensional position of the robot at the release teaching point.

Next, operational effects with the aforementioned four robots 4a to 4d being movable in parallel with the work transfer direction will be explained. Since the four robots 4a to 4d are placed so that two robots are at each of the left and right sides of the centering devices 3a and 3b in the work transfer direction to oppose each other and to be movable in parallel with the transfer direction, the opposing two robots are movable close to and away from each other. As a result, for example, when one of them is stopped for maintenance while the other one is operated, the stopped one is kept away from the other one, whereby interference can be prevented and favorable maintenance can be provided. It should be noted that several poles (not shown) for guiding and holding the work W are vertically placed on the pallet 6 and the positions of the vertical placement of the poles differ according to the shape of the work in some cases. In such cases, the robots 4a to 4d are moved so that the work can be loaded from the suitable direction in which the robots do not interfere with the poles. Consequently, an operation can be performed with the optimal loading posture, and therefore operability can be improved.

In the first embodiment, the explanation is made with a panel being taken as the example of the work W, but this is not restrictive. The means for holding the work W is not limited to the suction device, and the other holding means by gripping, nipping, and the like may be adopted.

As explained above, the following effects can be obtained according to the present invention.

(1) Two of the centering devices for positioning the works and letting them be held by the robots are placed at the upstream and downstream positions in the work transfer direction, and four of the palletizing robots are placed at four corner positions of substantially a rectangle with the two robots at each of the left and right in the transfer direction to oppose each other with the two centering devices between them. Consequently, the four robots can be placed with the small installation space. In addition, out of the four robots, the ones at the diagonal positions are made pairs each, and each pair is alternately operated each time the two centering devices position the works, and therefore interference between the robots hardly occurs even if the distance between the robots is short. As a result, the four robots can be operated smoothly in the small space without interference, thus making it possible to correspond to a short cycle time of the press.

(2) The work holding operation above the centering devices where interference between the robots easily occurs, and the work loading operation above the pallets are alternately performed by the robots of each pair, and therefore the interference between the robots can be prevented with reliability.

(3) The release position of the work to be loaded into the pallet can be always obtained by the arithmetic operation from the number of loaded works based on various kinds of parameters previously stored. Consequently, even when a new work is loaded into the pallets in which several works are already loaded, the total number of loaded works is arithmetically operated based on the number of works already loaded therein and the number of works newly loaded, and based on the arithmetically operated total number of loaded works, the loading position (release position) of the next work to be loaded can be obtained, therefore making it possible to load the works with reliability. As a result, the short-loaded pallet can be also used, thus facilitating pallet management and making it possible to improve operability.

(4) The interlock signal for prevention of interference between the robots is transmitted and received to and from the robot controller via the controller, thus making the robot operation program for monitoring the interlock extremely simple, and reducing the number of program steps. Consequently, creation of the robot operation program and maintenance become dramatically easy, and the operation sequence processing speed becomes high, thus reducing the time required for the operation processing such as a robot drive shaft control.

Figure 15:
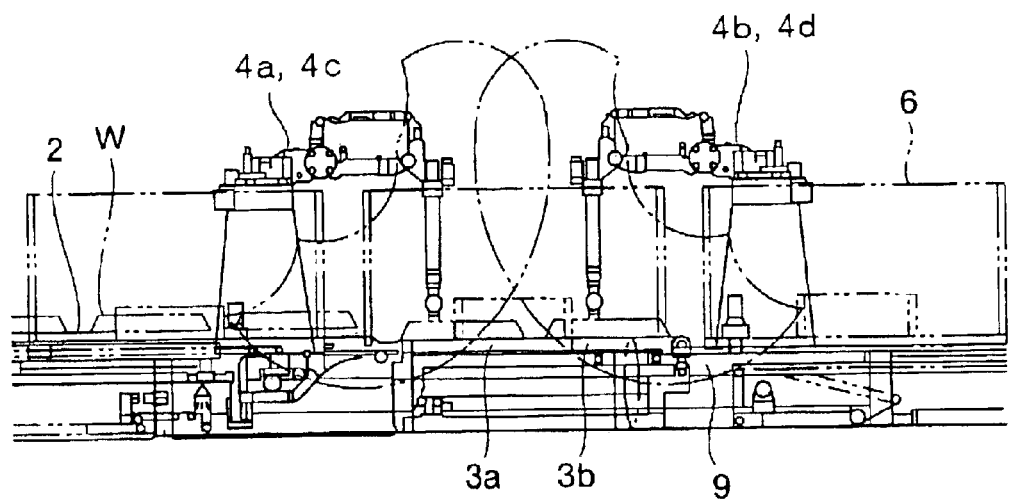
FIG. 15 is a side view explaining placement of robots according to the second embodiment.

Next, a work loading method and a work loading apparatus according to a second embodiment of the present invention will be explained with reference to the drawings. FIG. 14 is a block diagram of a press work line to which the work loading apparatus according to the present invention is applied, and FIG. 15 is a side view explaining the placement of robots. Concerning FIG. 14 and FIG. 15, the same components as in FIG. 1 of the first embodiment are given the same reference numerals and symbols, and the explanation thereof will be omitted.

Figure 16:
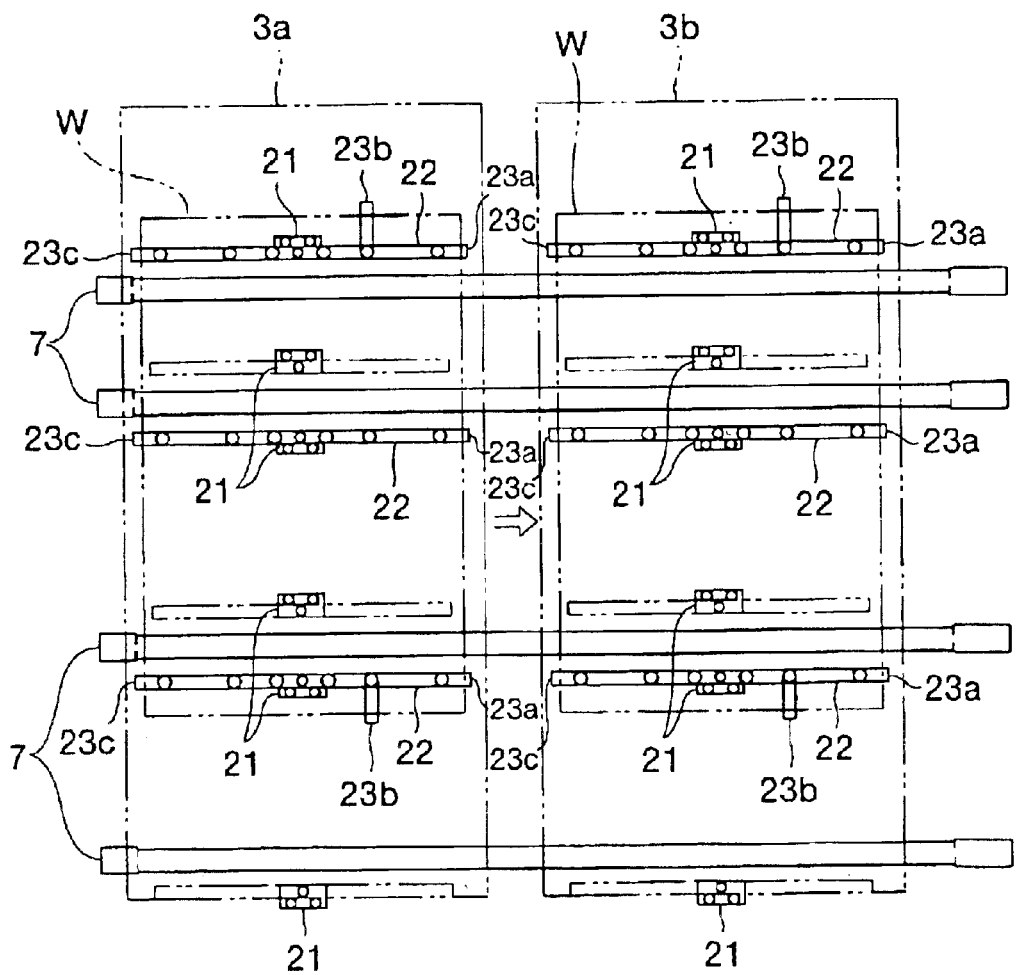
FIG. 16 is a plan view of centering devices according to the second embodiment.
Figure 17:
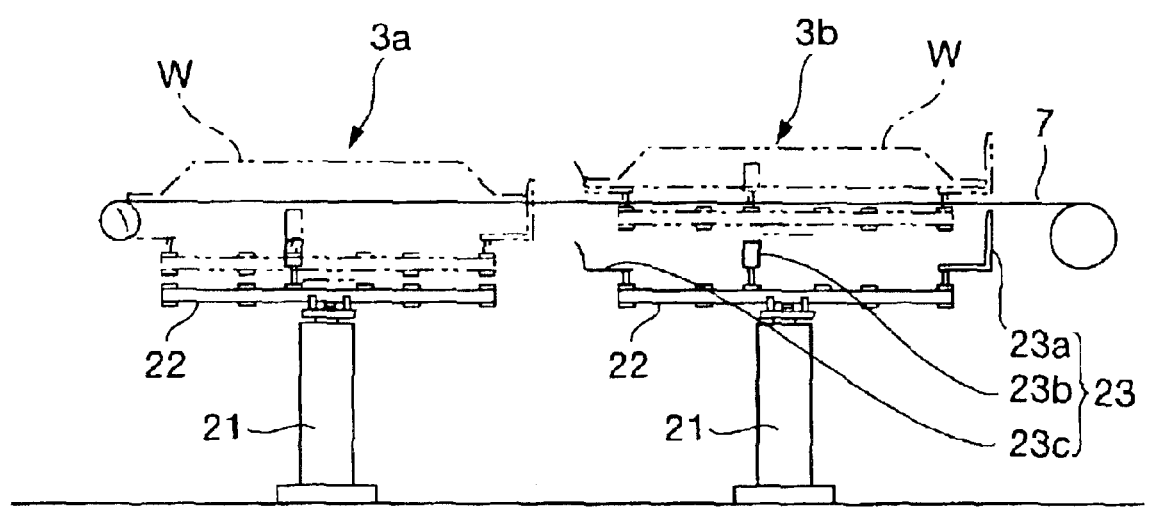
FIG. 17 is a side view of the centering devices according to the second embodiment.

As shown in FIG. 15, each of the robots 4a to 4d is mounted on rails 9 and 9 placed on both sides of the centering devices 3a and 3b in parallel with the work transfer direction, and it is an articulated robot movable substantially in a horizontal direction in parallel with the work transfer direction. As shown in FIG. 16 and FIG. 17, each of the centering devices 3a and 3b includes raising and lowering device or devices 21 at one side or both sides of each centering conveyor 7, and the raising and lowering device 21 is constituted to be movable with the centering conveyor 7 in a lateral direction with respect to the transfer direction according to the shape of the work W. A centering bracket 22 is attached to an upper part of the raising and lowering device 21 to be attachable and detachable, and the centering brackets 22 with guides 23 being attached according to the shape of the work W are attached to the required spots (in FIG. 16, three spots shown by the solid line at each of the centering devices 3a and 3b) according to the shape of the work W. The guide 23 is constituted by a front guide 23a, a side guide 23b and a rear guide 23c. Each of the centering devices 3a and 3b raises the centering bracket 22 mounted with the guide 23 by the raising and lowering device 21, and thereby make the guide 23 abut to longitudinal ends and lateral ends in the transfer direction, of the work W transferred by the centering conveyor 7 to position the work W.

When the work of the press 1 is single-piece working (namely, one work is worked at each shot of the press 1), each of the centering devices 3a and 3b form one centering station as shown in FIG. 16, and positioning of two of the works W is performed on the two stations in total. When the work of the press 1 is so-called two-piece working at the left and the right, the centering devices 3a and 3b are mounted with the guides 23 so as to constitute two centering stations arranged in the lateral direction corresponding to the lateral pair of centering conveyors 7 and 7 as shown in FIG. 18, and positioning of the works W1 and W2 of two shots, which are transferred by being arranged on the left and the right is performed on the four stations in total.

Based on a control constitution block diagram shown in FIG. 2, the control constitution of the work loading apparatus will be explained. FIG. 2 is the same as the control constitution of the automatic palletizer apparatus in the first embodiment, and only the different points will be explained. A setup personal computer 18 is connected to the controller 10. The controller 10 inputs setup data such as, for example, die number and attachment number therein from the setup personal computer 18, and based on this setup data, it automatically controls setups of replacement of the centering bracket 22 and attachments of each of the robots 4a to 4d, and the like according to the work W.

The two centering devices 3a and 3b are provided with position sensors (not shown) for detecting work positioning completion, namely, centering completion, and centering completion signals thereof are inputted into the controller 10. The controller 10 controls a change-over valve or a servo amplifier (both not shown) to drive the raising and lowering devices 21 based on the centering completion signals of the two centering devices 3a and 3b so that the works W which are intermittently transferred by the carrying-out conveyor 2 and the centering conveyor 7, are positioned at the centering device 3a at the upstream side and the centering device 3b at the downstream side every two press cycles of the press 1.

Interference prevention between the respective robots 4a to 4d is controlled in consideration of not only the interference between the single robots, but also the attachment mounted on a tip end of each of the robots 4a to 4d, and the work W held by the attachment. As the interference areas, there are two kinds of areas, that is, the centering interference area and the pallet interference area. The centering interference area is the area where there is the fear of interference when the robots move to take up the positioned works W, and the pallet interference area is the area where there is the fear of interference when the robots load the works W, which they take up and hold, into the pallets 6. The robots involved in interference with each other in the centering interference area are the front #1 and the rear #1 robots 4a and 4c at the upstream side, and the front #2 and the rear #2 robots 4b and 4d at the downstream side. The robots involved in interference with each other in the pallet interference area are the front #1 and the front #2 robots 4a and 4b at the right side and the rear #1 and the rear #2 robots 4c and 4d at the left side in the work transfer direction.

The interference prevention control will be explained with the front #1 robot 4a being cited as an example. The robot controller 11a turns ON the centering interference area entry I/L signal at the same time when the front #1 robot 4a enters the centering interference area of the centering device 3a, and it turns OFF the centering interference area entry I/L signal at the same time when the front #1 robot 4a leaves the area. Similarly, the robot controller 11a turns ON the pallet interference area entry I/L signal at the same time when the front #1 robot 4a enters the pallet interference area, and it turns OFF the pallet interference area entry I/L signal at the same time when the front #1 robot 4a leaves the pallet interference area.

The controller 10 does not transmit an enabling signal for the rear #1 robot 4c to move to the centering device 3a to the robot controller 11c when the centering interference area entry I/L signal from the robot controller 11a is ON. The controller 10 transmits the enabling signal to move to the centering device 3a to the robot controller 11c only when the centering interference area entry I/L signal is OFF, and the rear #1 robot 4c is enabled to move to the centering device 3a. Similarly, the controller 10 does not transmit an enabling signal for the front #2 robot 4b to move to the pallet 6 when the pallet interference area entry I/L signal from the robot controller 11a is ON, and it transmits the enabling signal to move to the pallet 6 to the robot controller 11b only when the pallet interference area entry I/L signal is OFF, and the front #2 robot 4b is enabled to move to the pallet 6.

The other robots also shift to the moving sequence to the centering devices 3a and 3b, or the pallet 6 based on the same I/L signals and the enabling signals to move, whereby interference between the respective robots 4a to 4d is prevented. Consequently, the front #1 robot 4a itself (1) is enabled to move to the centering device 3a by receiving the enabling signal to move, from the controller 10 only when the robot controller 11c turns OFF the centering interference area entry I/L signal (when the rear #1 robot 4c is not in the centering interference area), and (2) is enabled to move to the pallet 6 by receiving the enabling signal to move, from the controller 10 only when the robot controller 11b turns OFF the pallet interference area entry I/L signal (when the front #2 robot 4b is not in the pallet interference area).

Next, a loading procedure of the works W by the work loading apparatus according to the second embodiment will be explained with the case, in which the work of the press 1 is a single piece working, being taken as an example, with use of FIG. 19A to FIG. 19F.

Figure 19A:
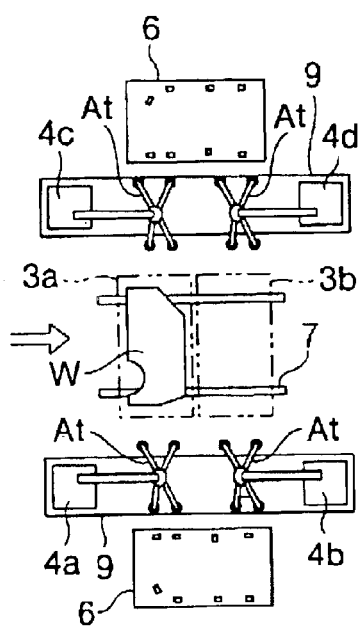
FIG. 19A to FIG. 19F are explanatory views of a work loading procedure according to the second embodiment.

(1) FIG. 19A: Each of the robots 4a to 4d takes a standby posture so that the opposing robots in the transfer direction do not interfere with each other while moving the work W onto the pallet 6. The standby posture means the posture in which they are located to be away from each other on the rails 9, and they hold attachments At high, which are mounted at tip ends of the arms of the robots to suck the works W. The work W, which is intermittently transferred by the carrying-out conveyor 2 (see FIG. 14) and the centering conveyor 7 every press cycle, is transferred to the centering device 3a at the upstream side out of the centering devices 3a and 3b.

Figure 19B:
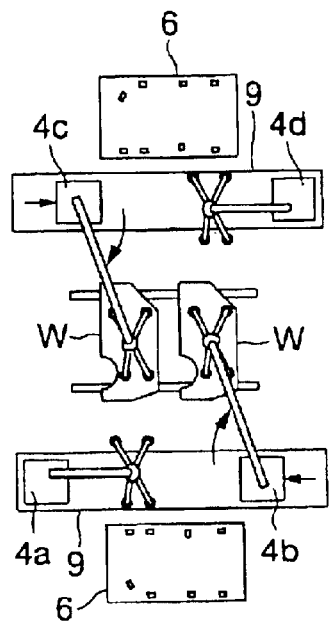

(2) FIG. 19B: From the next press cycle, the works W and W are transferred to the centering devices 3a and 3b, and by driving of the raising and lowering devices 21 (see FIGS. 16 and 17), the works for two shots are positioned. Here, at the time of starting from the standby posture, the front #2 and the rear #1 robots 4b and 4c are preferentially actuated. The front #1 and the rear #2 robots 4a and 4d keep the standby posture, and the front #2 and the rear #1 robots 4b and 4c move their attachments At to the centering devices 3b and 3a to take up the positioned works W, and hold the works W by suction. In this situation, the front #2 and the rear #1 robots 4b and 4c may move on the rails 9 so that they move closer to the respective centering devices 3b and 3a.

Figure 19C:
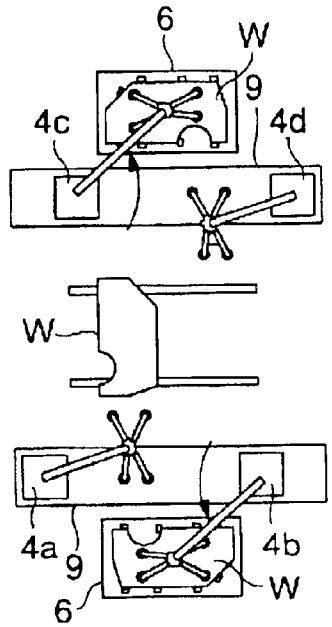

(3) FIG. 19C: The front #2 and the rear #1 robots 4b and 4c move the works W and W which they hold to the pallets 6 and 6. At this time, the pallet interference area entry I/L signal of the front #2 and the rear #1 robots 4b and 4c is turned ON, and the centering interference area entry I/L signal is turned OFF. Thereupon, the front #1 and the rear #2 robots 4a and 4d start work taking-up operation after turning ON the centering interference area entry I/L signal, and are on standby above the centering devices 3a and 3b until the centering is completed. The following work W is transferred to the centering device 3a at the upstream side according to the next press cycle.

Figure 19D:
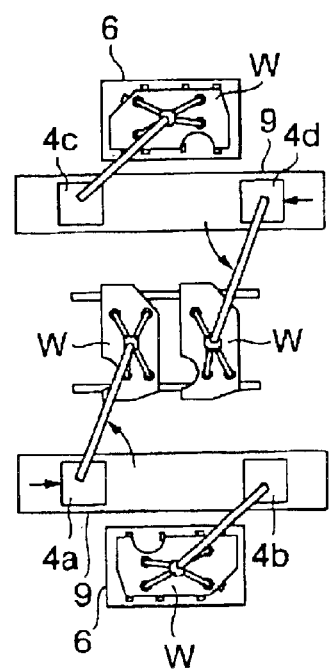

(4) FIG. 19D: According to another next press cycle, the works W and W are transferred to the centering devices 3a and 3b, and the works for two shots are positioned. The front #1 and the rear #2 robots 4a and 4d move the attachments At thereof to the centering devices 3a and 3b, and hold the works W by suction. In this situation, the front #1 and the rear #2 robots 4a and 4d may move on the rails 9 to move closer to the respective centering devices 3a and 3b. Meanwhile, the front #2 and the rear #1 robots 4b and 4c place the works W and W, which they hold, on the pallets 6 and 6.

Figure 19E:
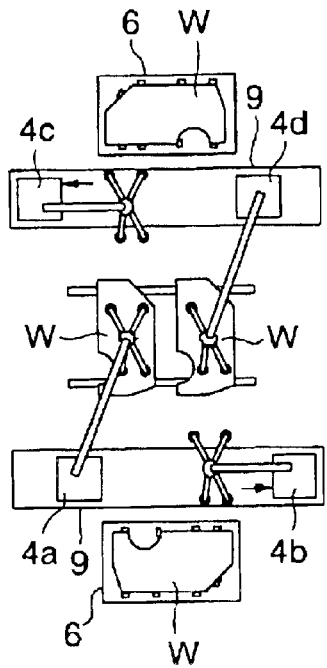

(5) FIG. 19E: The front #2 and the rear #1 robots 4b and 4c, which finish loading the works into the pallets 6 and 6, return to the standby posture. In this situation, the pallet interference area entry I/L signal of the front #2 and the rear #1 robots 4b and 4c is turned OFF, and therefore after the centering interference area entry I/L signal is turned OFF and the pallet interference area entry I/L signal is turned ON, the front #1 and the rear #2 robots 4a and 4d start to move to the pallets 6 and 6.

Figure 19F:
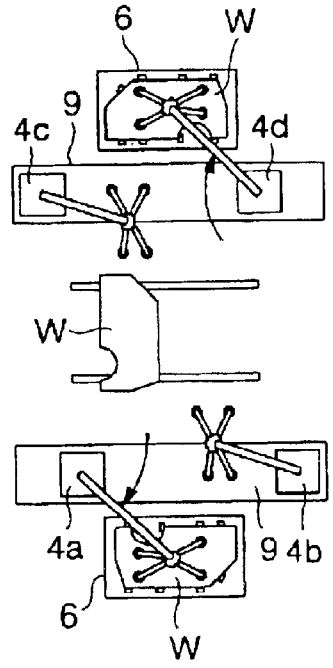

(6) FIG. 19F: The front #1 and the rear #2 robots 4a and 4d place the works W and W, which they hold, onto the pallets 6 and 6. In this situation, the centering interference area entry I/L signal of the front #1 and the rear #2 robots 4a and 4d is OFF in this situation, the front #2 and the rear #1 robots 4b and 4c start a work taking-up operation. The following work W is transferred to the centering device 3a at the upstream side according to the next press cycle. Thereafter, the process steps from the FIG. 19B are repeated to continue the loading operation.

Figure 20:
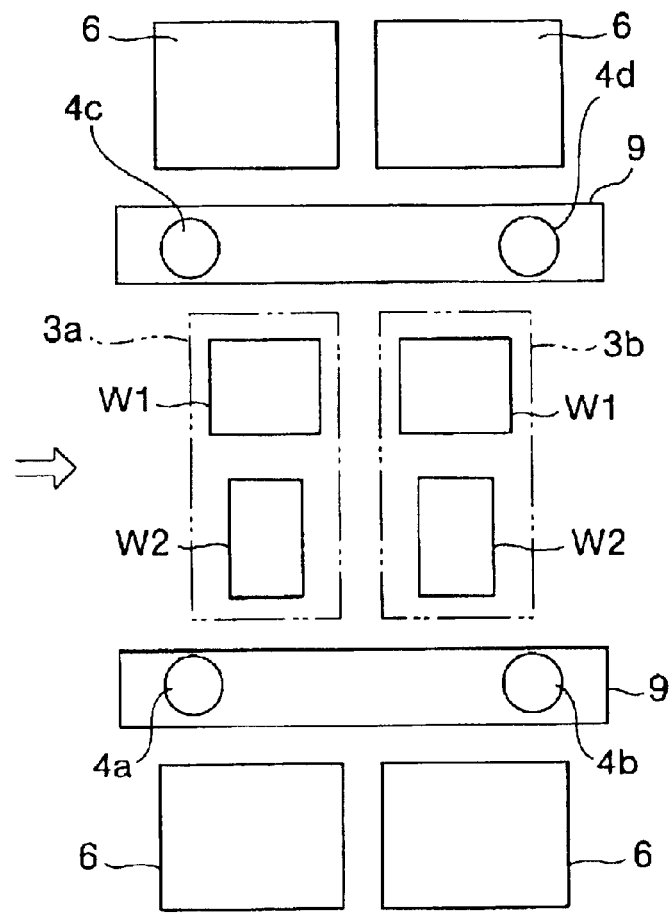
FIG. 20 is an explanatory view of work loading according to another mode of the second embodiment.

In the above description, the case in which working of the press 1 is single-piece working is explained. In the case in which working of the press 1 is two-piece working, the works W1 and W2 transferred by being arranged in the lateral direction with respect to the transfer direction are smaller as compared with the single-piece working, and one pallet 6 is assigned to each of the robots 4a to 4d, as shown in FIG. 20. Consequently, the opposing robots can perform the work loading operation without interfering with each other. Namely, a centering interference area and a pallet interference area don't have to be set. Consequently, the works W1 and W1, and W2 and W2, which are transferred to the centering devices 3a and 3b by two press cycles, are taken up by each of the robots 4a to 4d at substantially the same time and moved to the pallet 6 after being positioned.

According to the second embodiment, by the two centering devices 3a and 3b which are placed along the transfer direction directly under the downstream of the carrying-out conveyor 2, the works W for two shots, which are transferred from the press 1 every two cycles of the press 1, are positioned. The works W are taken up and loaded into the pallets 6 by two pairs of robots 4a and 4c, and 4b and 4d, which are provided correspondingly to the two centering devices 3a and 3b. In the case in which working is a single-piece working, the robots 4a and 4c, and 4b and 4c, which respectively oppose each other with each of the centering devices 3a and 3b between them, alternately take up the works W, and in the case in which working is two-piece working, each of the robots 4a to 4d takes up the work W at the same time, and performs a loading operation into the pallet 6. Accordingly, the press cycle time can be shortened with the maximum cycle time which the robots have, without being influenced by operation time of the separating device which is provided between the conventional press and the robots. On this occasion, in any case, even if single cycle time of each of the robots 4a to 4d is longer than the press cycle, if the cycle of the robot is completed within two press cycles, the press work line with the cycle time in which full use can be made of the productivity of the press 1 can be constructed. Further, even if the cycle of the robot exceeds the two press cycles, the loading operation can be performed with a dramatically shorter cycle time then in the case in which the work is loaded every press cycle, thus making it possible to construct the press work line with excellent productivity.

Further, it can cope with the cases of single-piece working and two-piece working, and therefore the press work line with high general versatility can be constructed. Furthermore, since the centering devices 3a and 3b are placed directly under the carrying-out conveyor 2, the press work line can be constructed with more compact space than the case in which the separating device is provided.

In the second embodiment, each of the robots 4a to 4d is constituted to be movable on the rails 9 and 9. Consequently, when the large work W is loaded onto the pallet 6, the robots opposing each other in the transfer direction move in the direction to be away from each other, and therefore interference between the work W and the robots can be easily prevented. When the work W is taken up, each of the robots 4a to 4d can move closer to the centering devices, and therefore the arm stroke of the robot can be made shorter, thus making it possible to reduce the cycle time of the single robot.

Figure 21:
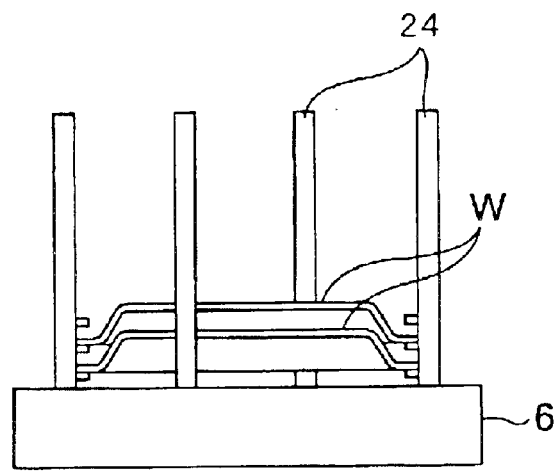
FIG. 21 is a side view of the pallet according to the second embodiment.

As shown in FIG. 21, a plurality of columnar work guides 24 for supporting the work W are vertically provided on the pallet 6. Meanwhile, since each of the robots 4a to 4d is movable, when the work W held at the attachment At on the tip end of the robot arm is placed on the pallet 6, each of the robots 4a to 4d can move to a desired position so that the robot arm and the work guides 24 do not interfere with each other to perform the loading operation. Consequently, design freedom of the work guides 24 of the pallet 6 is increased, and the work guides 24 can be placed at the optimal positions corresponding to the work W. When the robot is broken down and it becomes necessary to load the work W into the pallet 6 manually, the broken robot can be moved (retreated) to the position in which the loading operation is not hindered. As a result, the robot can be repaired while the work W is loaded manually, and therefore the press does not have to be stopped during the repair work, thus making it excellent in operability.

Figure 41:
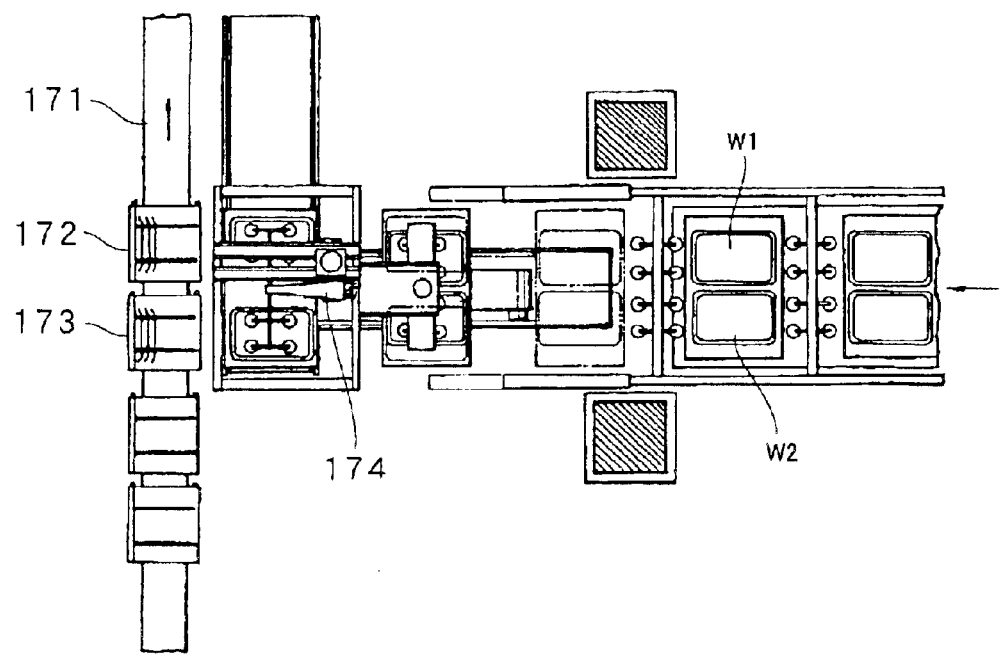
FIG. 41 is an example of conventional palletizing system constitution.

When the different kinds of works W1 and W2 are produced with two-piece working, the number of works held by the pallet loaded with the work W1 and the number of works held by the pallet loaded with the works W1 and W2 sometimes differ. Namely, when the inner plate and the outer plate of the door of an automobile are worked by two-piece working, the number of the inner plates held by the pallet is about 100 since the inner plates are permitted to have a few flaws and can be placed in layers, and the number of the outer plates held by the pallet is about 20 as a result of providing a partition at the work guides 24 since the outer plates are not permitted to have any flaws. For example, as shown in FIG. 41 accompanying Japanese Patent Laid-open No. 63-115635, there is the system constitution in which two pallets 172 and 173 are fed as a set on a conveyor 171, and the works W1 and W2 worked by two-piece working are housed in the pallets 172 and 173 by a robot 174. In this constitution, when one of the two pallets 172 and 173 is filled, the other pallet is also sent out even if the other pallet is not filled. In such a system constitution, when the pallet for the outer plates, which holds the smaller number of plates as described above (assumed to be the pallet 172), is filled, both the pallets 172 and 173 are sent out even if the pallet for the inner plates (assumed to be the pallet 173) is not filled, and therefore holding efficiency of the pallet 173 which can hold more is reduced.

On the other hand, in the above-described second embodiment, the pallets 6 and 6 into which the works W are loaded are placed on each of the left and the right in the work transfer direction. Consequently, the works W1 and W2 of different kinds worked by two-piece working are loaded into the left and right pallets 6 and 6 separately, whereby each of the pallets can be fed according to the number of the works it holds, thus making it excellent in holding efficiency.

It goes without saying that the work loading apparatus according to the present invention is not limited to the above-described second embodiment and any change can be made within the scope of the present invention. For example, in the second embodiment, the example provided with the two centering devices in the work transfer direction is explained, but they are not limited to two, and three or more may be provided. Namely, when the cycle time of the robot is three times as long as the press cycle or more, the apparatus may be constituted so that a third centering device and a pair of robots corresponding thereto are further provided and the works W for three shots are positioned and loaded every three press cycles. As the robot, the example with the articulated robots is explained, but the other types of robots such as cartesian coordinates robots and cylindrical coordinates robots may be used. Further, if it is possible to place a peripheral device, it may be constituted so that the work W is directly carried out of the press 1 to the centering conveyor 7 by a work feeder without providing the carrying-out conveyor 2.

Figure 22:
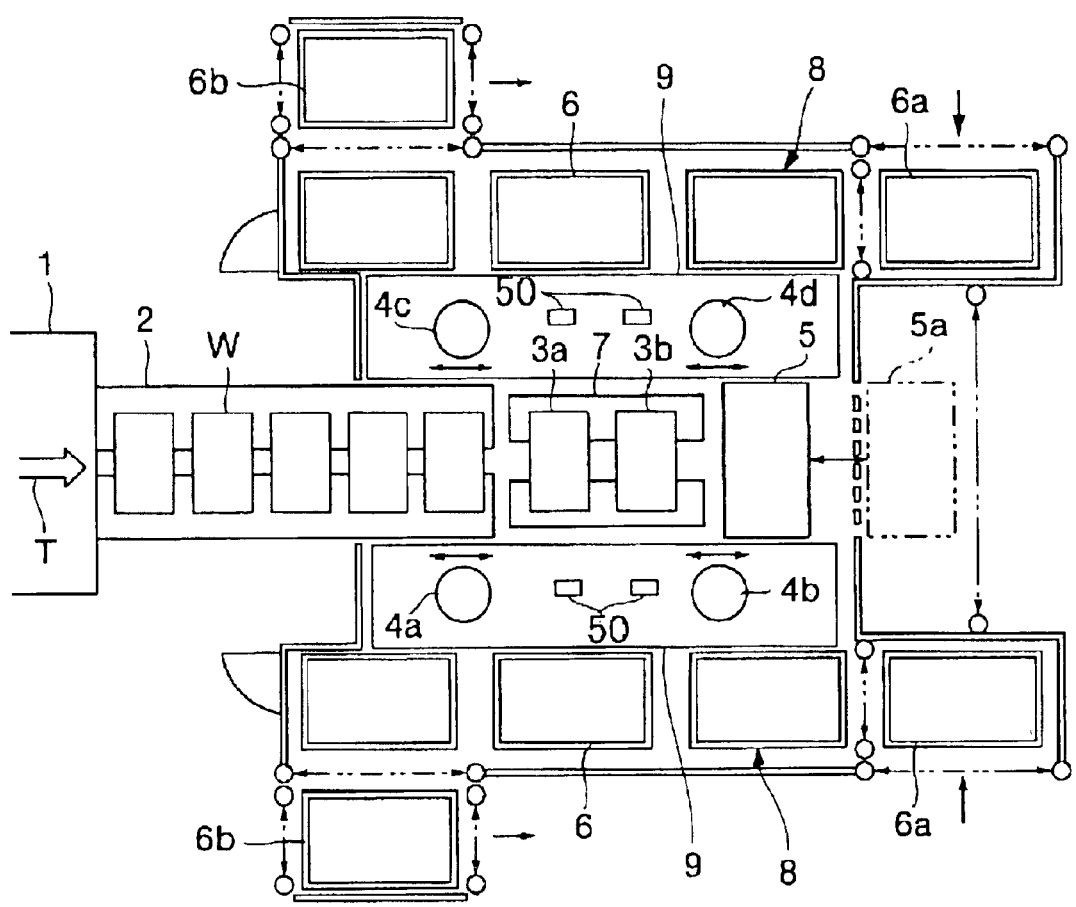
FIG. 22 is a block diagram of a press work line according to a third embodiment of the present invention.
Figure 23:
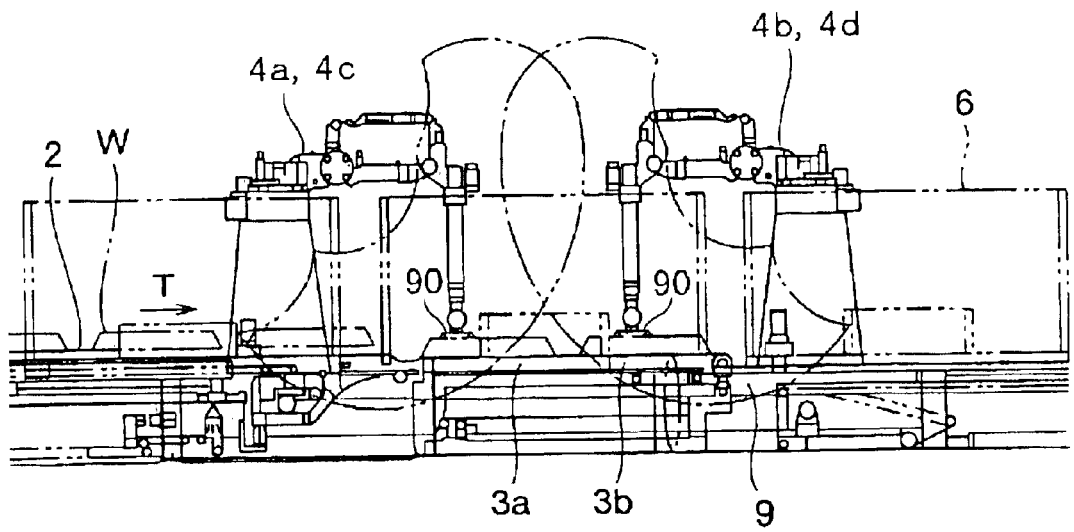
FIG. 23 is a side view explaining placement of the robots according to the third embodiment.

Next, a work loading apparatus and an attachment replacing method thereof according to a third embodiment of the present invention will be explained with reference to the drawings. FIG. 22 is a block diagram of a press work line to which the work loading apparatus according to the third embodiment is applied, and FIG. 23 is a side view explaining placement of the robots according to the third embodiment. About FIG. 22 and FIG. 23, the points different from FIG. 1 (the first embodiment) or FIGS. 14 and 15 (the second embodiment) will be mainly explained.

In FIG. 22 and FIG. 23, the pallet feeders 8 and 8, which transfer the pallets 6 to the work loading position and an attachment replacing position to be able to position them, are placed at opposite sides from the centering devices 3a and 3b with the robots 4a and 4b, and the robots 4c and 4d between them. The pallet feeders 8 and 8 transfer the pallets 6 along guide rails (not shown) from the pallet carrying-in port 6a to the pallet carrying-out port 6b. The method with which the pallet feeders 8 and 8 transfer the pallets 6 is not limited to only one, but the mobile carriage method in which a plurality of carriages move with the pallets 6 placed thereon, or the conveyor method of feeding the pallets 6 with a conveyor may be adopted. As for the pallet 6, two kinds of pallets, that is, the pallet into which the work W is loaded, and the pallet into which a robot attachment 90 and attachments for the centering devices 3a and 3b, which correspond to the kind of work W, are loaded are prepared. The arrow T is the work transfer direction.

Figure 24:
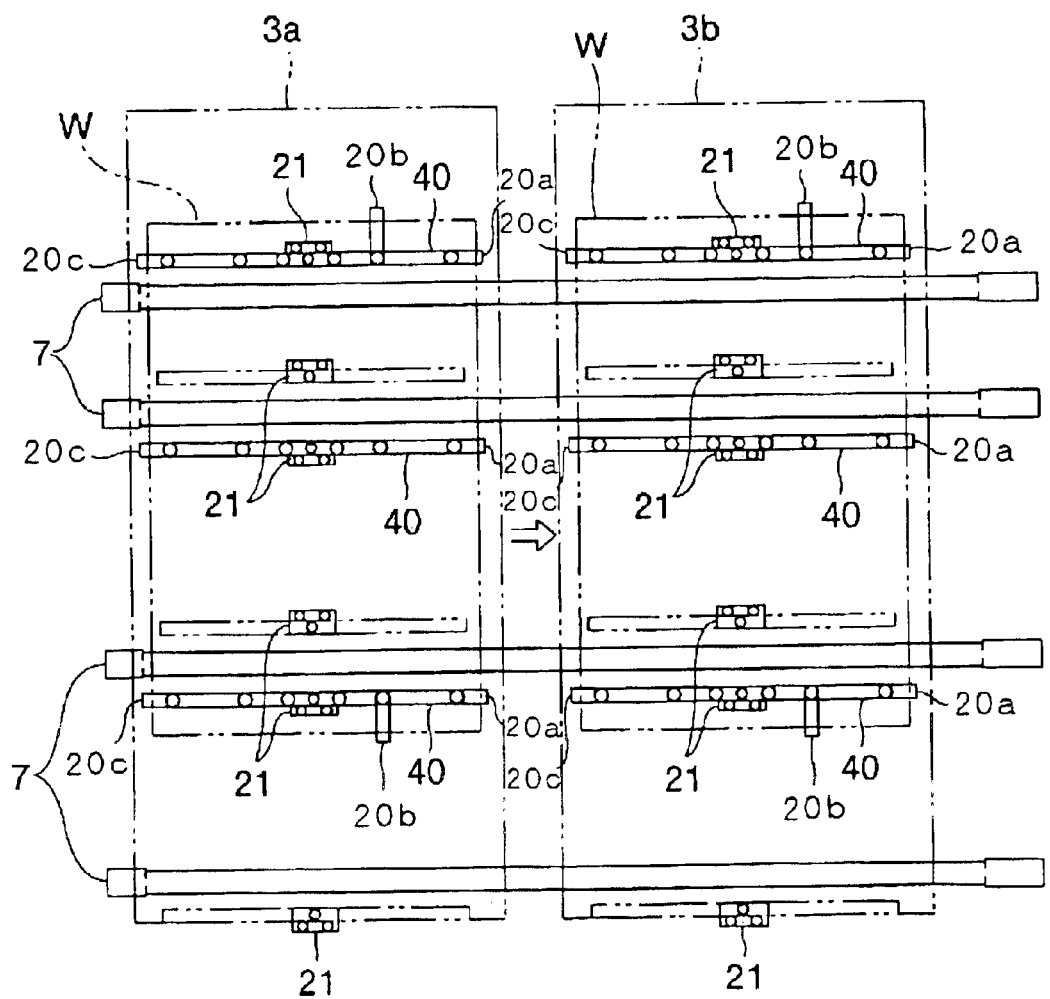
FIG. 24 is a plan view of centering devices according to the third embodiment.
Figure 25:
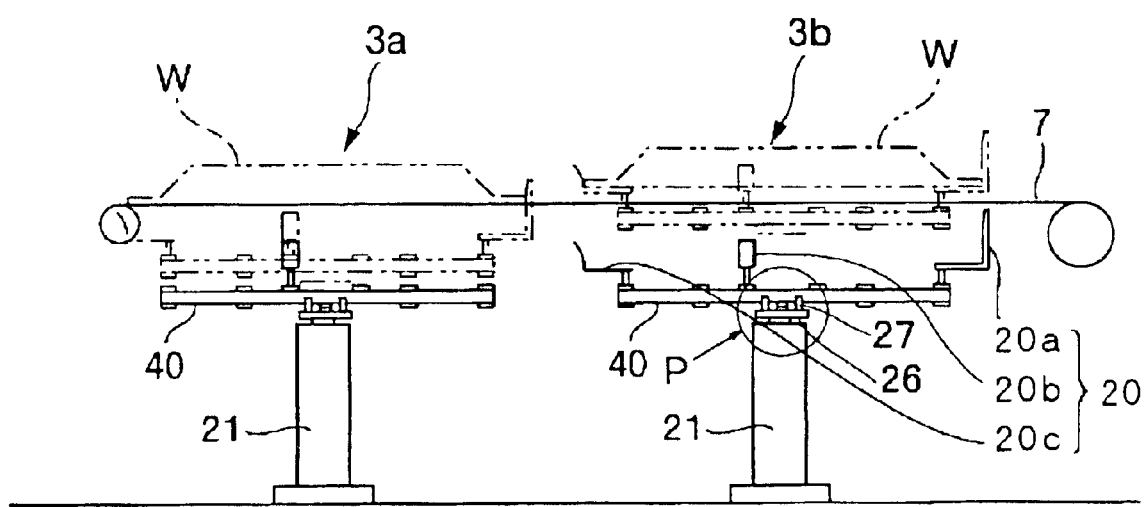
FIG. 25 is a side view of the centering devices according to the third embodiment.
Figure 26:
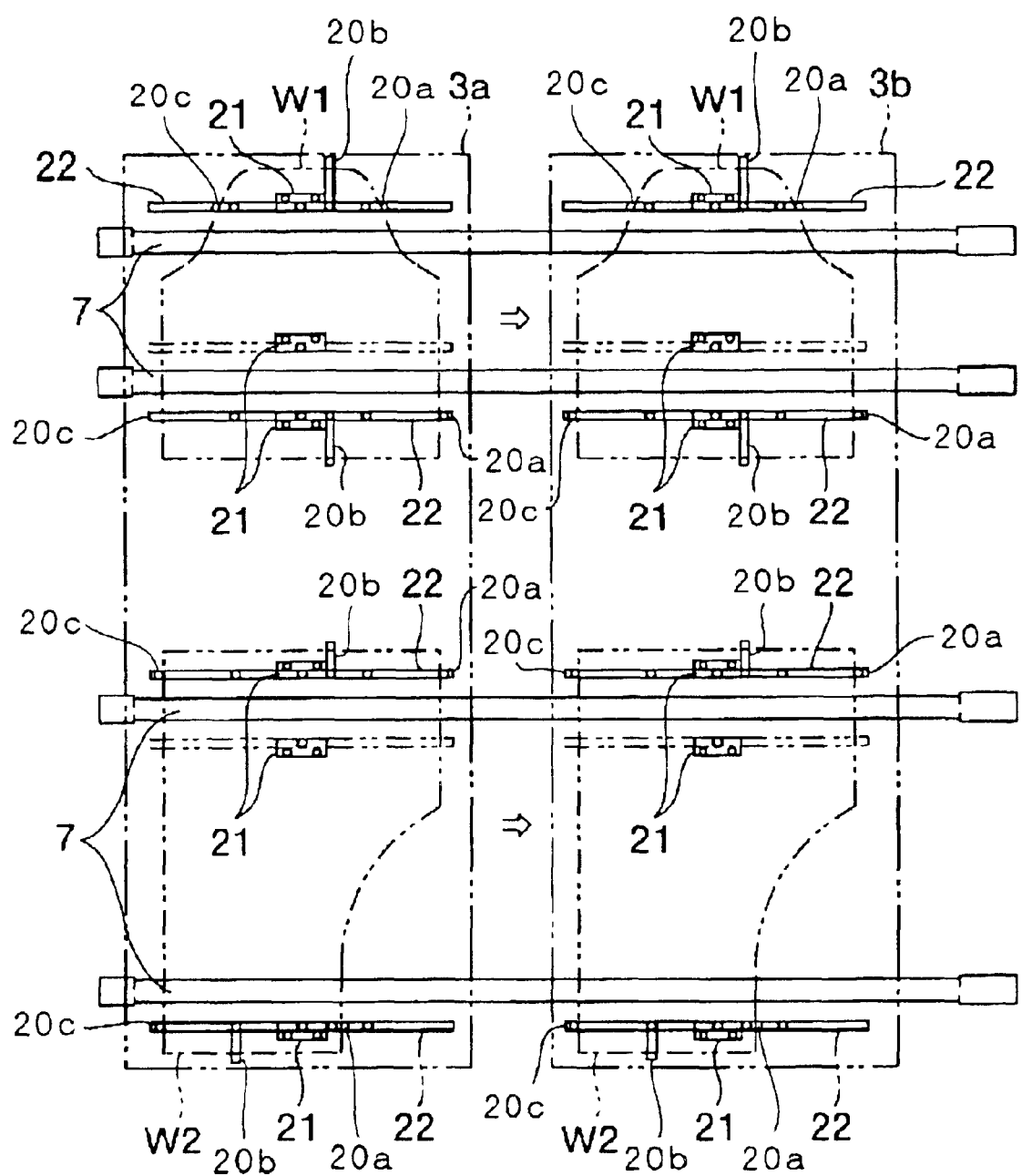
FIG. 26 is a plan view of the centering devices according to another mode of the third embodiment.

As shown in FIGS. 24 and 25, each of the centering devices 3a and 3b include the raising and lowering device or devices 21 at one side or both sides of each of the centering conveyors 7. Each of the raising and lowering devices 21 and the centering conveyors 7 are provided to be movable in the lateral direction with respect to the transfer direction, and are movable in the lateral direction according to the shape of the work W. A centering bracket 40 is attached at the upper part of each of the raising and lowering devices 21 to be attachable and detachable, and the centering brackets 40, which are mounted with nests 20 that are guide members and positioning members for the work W according to the shape of the work, are attached at required spots according to the shape of the work W. Here, the nest 20 is constituted by a front nest 20a, a side nest 20b, a rear nest 20 and the like. The above-described "required spots" are the three spots shown by the solid line on each of the centering devices 3a and 3b in FIG. 24. Each of the centering devices 3a and 3b raises the centering brackets 40 mounted with the nests 20 by means of the raising and lowering devices 21, and thereby makes the nests 20 abut to the longitudinal ends and lateral ends in the transfer direction, of the work W, which is intermittently transferred by the centering conveyor 7 to position the work W. The raising and lowering device 21 has raising and lowering drive means such as a cylinder or a servo motor.

In the case in which working of the press 1 is single-piece working, each of the centering devices 3a and 3b forms one centering station, and positioning of two works W is performed on the two stations in total. In the case in which working of the press 1 is so-called two-piece working at the left and the right, the nests 20 are mounted so that each of the centering devices 3a and 3b constitutes two centering stations arranged in the lateral direction corresponding to a pair of left and right centering conveyors 7 and 7. Consequently, positioning of the works W1 and the works W2 for two shots of the press 1, which are transferred by being arranged at the left and right, is performed on the four stations in total.

Figure 27:
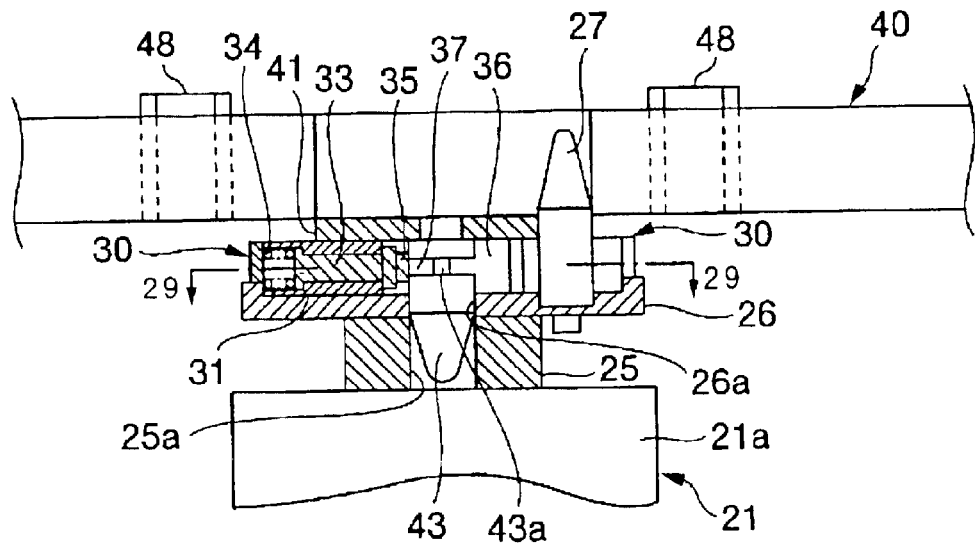
FIG. 27 is a detailed view of a portion P in FIG. 25.
Figure 28:
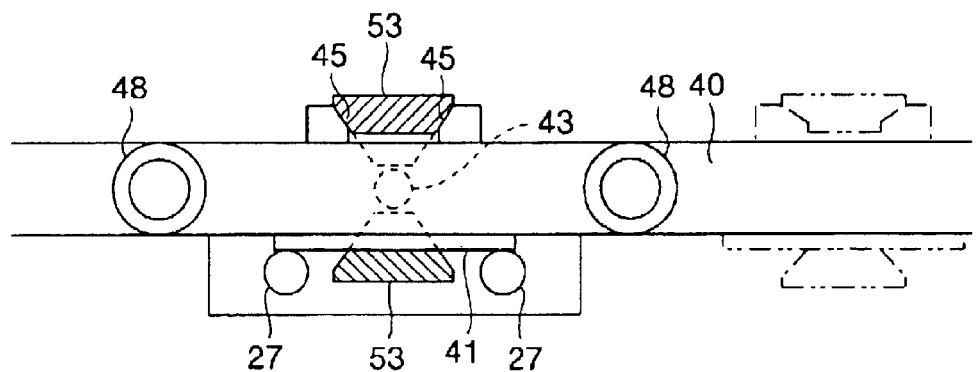
FIG. 28 is a plan view of FIG. 27.
Figure 29:
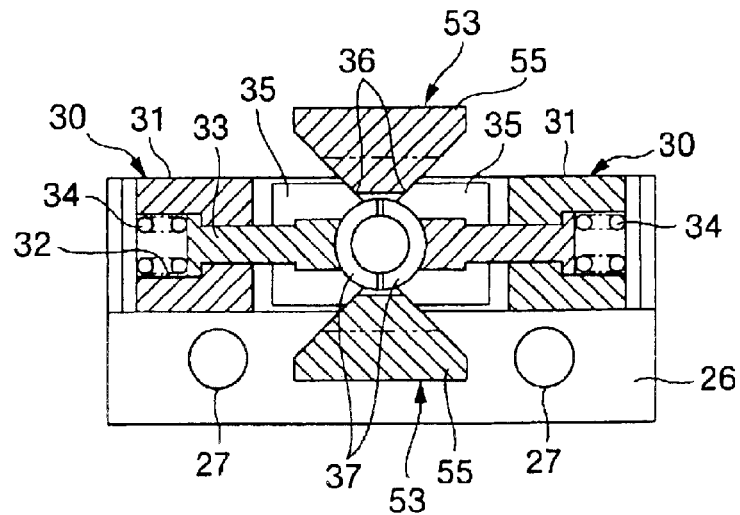
FIG. 29 is a sectional view taken along the line 29—29 in FIG. 27.

Next, an attaching and detaching mechanism for the attachments for the centering devices 3a and 3b will be explained based on FIG. 27 to FIG. 32. First, the attaching and detaching mechanisms for the centering devices 3a and 3b mounted with the centering brackets 40 and the pallet for attachment will be explained. FIG. 27 is a detailed view of a part P in FIG. 25, which shows a partial sectional view of a side surface of an essential part, FIG. 28 is a plan view of FIG. 27, and FIG. 29 is a sectional view taken along the line 29—29 in FIG. 27. As shown in FIG. 27 and FIG. 28, a plate 26 provided with a locking hole 26a at the same position as a hole 25a is fixedly provided at a top end portion of a raising and lowering member 21a of the raising and lowering device 21, which is provided to be ascendable and descendable, via a locking member 25 having the hole 25a in the vertical direction. On a top part of the plate 26, a pair of locking means 30 and 30 are attached on both sides in a longitudinal direction (at the left and right in the drawing) of the centering bracket 40 with the locking hole 26a between them. Two locking pins 27 and 27 are provided by the sides (in the direction of the side surface of the centering bracket 40) of a pair of left and right locking means 30 and 30, with head portions thereof being protruded upward.

Each of the lock means 30 includes a case 31 with a spring chamber 32 formed therein, and a rod 33 is fitted in the case 31 slidably in a direction toward a center of the locking hole 26a. A spring 34 is provided between a base end part of the rod 33 inserted in the spring chamber 32 and an inner wall of the spring chamber 32, and the rod 33 is biased in a direction to protrude from the case 31 by the spring 34. An operating piece 35 which has taper surfaces 36 and 36 at tip end sides on the left and right to the sliding direction, is attached at a tip end portion of the rod 33, and a locking member 37 having a shape of substantially a half-cut ring member is attached at a tip end portion of the operating piece 35 with its open part at which the ring member is cut in half facing to the tip end direction. The taper surface 36 of the operating piece 35 is a plane along the vertical direction, and forms an inclined surface which is away from the rod 33 as it extends to the base end part of the rod 33 from the side of the locking member 37. The centering bracket 40 is only placed on the pallet for the attachment, and the pallet does not include the lock means 30.

Figure 30:
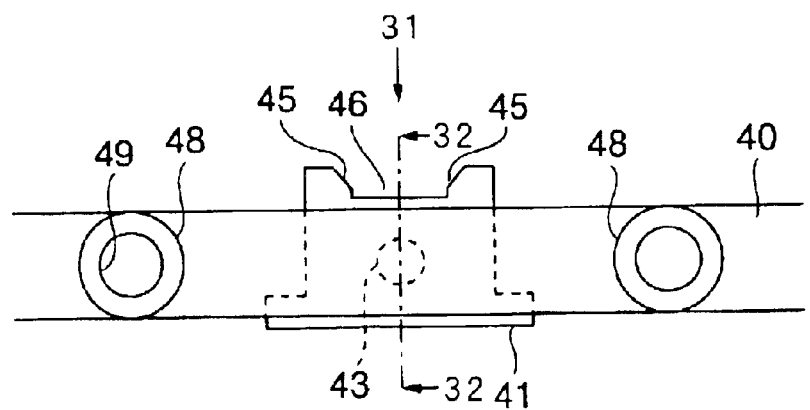
FIG. 30 is a plan view of a centering bracket according to the third embodiment.
Figure 31:
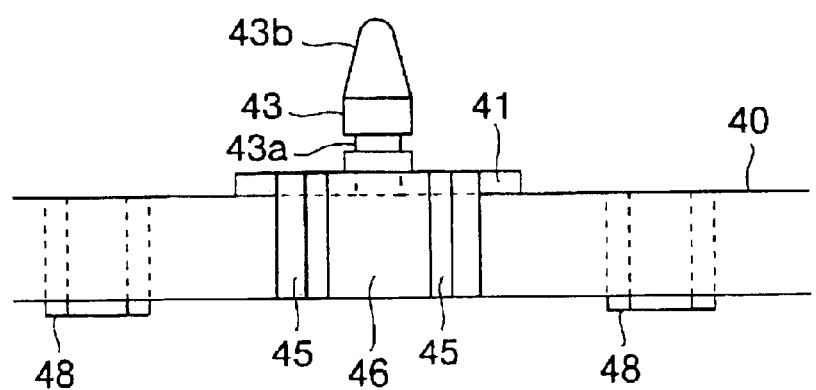
FIG. 31 is a view seen from the arrow 31 in FIG. 30.
Figure 32:
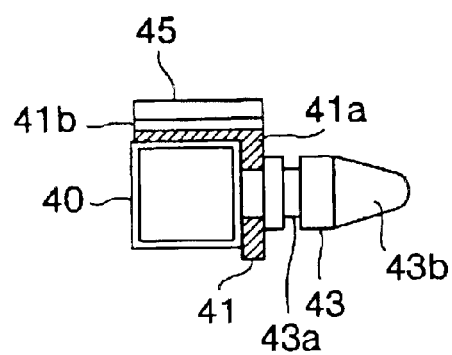
FIG. 32 is a sectional view taken along the line 32—32 in FIG. 30.

Next, an attaching and detaching mechanism on the side of the centering bracket 40 will be explained. FIG. 30 is a plan view of the centering bracket 40 shown in FIG. 28, and FIG. 31 and FIG. 32 are views seen from the arrow 31 in FIG. 30, and a sectional view taken along the line 32 to 32 in FIG. 30, respectively. A bracket 41 which is substantially L-shaped in side view is fixed to an undersurface and a side surface of a mounting part of the centering bracket 40 as shown in FIG. 32. The bracket 41 has an undersurface side member 41a and a side face side member 41b vertically provided at an end portion of the undersurface side member 41a. A locking pin 43 is fixed to the undersurface side member 41a with its head portion being protruded downward. The head portion of the locking pin 43 forms a taper part 43b with its diameter becoming smaller toward a tip end, and a reduced diameter portion 43a with a smaller diameter than the tip end portion is formed at a base end portion. A groove portion 46 opened to a side direction is formed along the vertical direction at the side face side member 41b. Taper surfaces 45 and 45 having substantially the same inclined angle as the taper surface 36 of the operating piece 35 are formed at inlet parts of both opposing side faces of the groove portion 46. Mounting members 48 each having a hole 49 for mounting the nest 20 are attached at predetermined positions of the centering bracket 40.

As shown in FIG. 27 and FIG. 28, in the state in which the centering bracket 40 mounted with the nest 20 is attached at a top part of the raising and lowering device 21 of each of the centering devices 3a and 3b, the locking pin 43 provided at the undersurface part of the centering bracket 40 is inserted between both locking members 37 and 37 of a pair of opposing lock means 30 and 30, in the locking hole 26a of the plate 26, and the hole 25a of the locking member 25, respectively. The rod 33 of the lock means 30 is biased by the spring 34 to engage in both the locking members 37 and 37 at the reduced diameter portion 43a of the locking pin 43. In this situation, as known from FIG. 28, the side surfaces of the two locking pins 27 and 27 of the plate 26 abut to an end surface of the undersurface side member 41a of the bracket 41 fixed to the centering bracket 40, and functions as a baffle.

Figure 33:
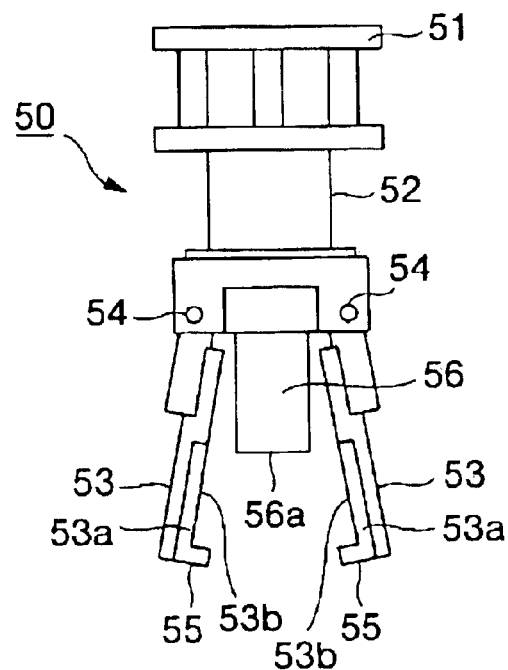
FIG. 33 is a front view of an attaching and detaching hand according to the third embodiment.
Figure 34:
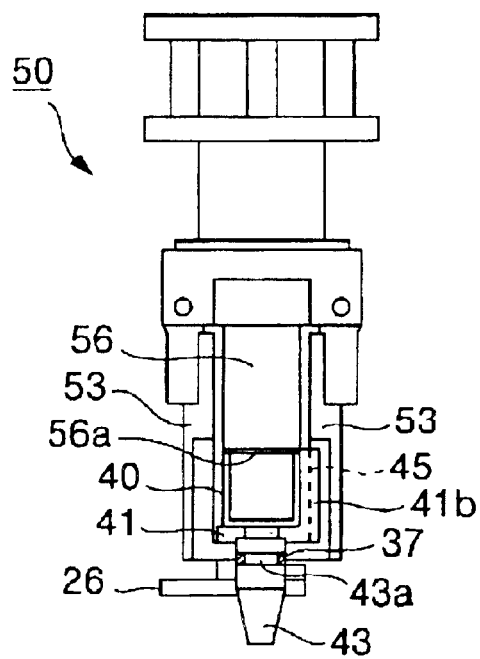
FIG. 34 is an operation explanatory view of the attaching and detaching hand in FIG. 33.

Meanwhile, when the attachments such as the nest 20 of each of the centering devices 3a and 3b are replaced according to the shape and the kind of the work W, an attaching and detaching hand 50 for the attachment as shown in FIG. 33 and FIG. 34 is attached at the arm tip end portion of each of the robots 4a to 4d in place of the work holding attachment such as a suction device. In FIG. 33 and FIG. 34, the attaching and detaching hand 50 includes a mounting block part 51 which is made attachable at the arm tip end portion of the robots 4a to 4b by suction means or the like, a hand main body 52 provided at a tip end side of the mounting block part 51, and a pair of opposing chuck pads 53 and 53 which are attached at a tip end side of the hand main body 52 to be openable and closable by means of pins 54 and 54. The chuck pad 53 has a taper surface 53a with the same inclined angle as the taper surface 45 on the side face from a midpoint to a tip end in a longitudinal direction. Hook parts 55 and 55, which are protruded toward each other, are formed at tip end portions of both the chuck pads 53 and 53. An abutment member 56, which is protruded toward a tip end and has an abutment surface 56a, that abuts to the top surface of the centering bracket 40 of the centering devices 3a and 3b, on the protruded tip end portion, is attached at the tip end side of the hand main body 52 in a middle area between both the chuck pads 53 and 53. The attaching and detaching hand 50 for the attachment is housed in the vicinity of each of the robots 4a to 4d (for example, predetermined positions between the opposing robots 4a and 4b and between the opposing robots 4c and 4d) to be able to be taken in and out.

Here, an operation performed when the attachment for the centering devices 3a and 3b, namely, the centering bracket 40 mounted with each nest 20 is attached and detached with the attaching and detaching hand 50 will be explained with reference to FIG. 27 to FIG. 29, and FIG. 34. First, an operation performed when gripping the centering bracket 40 with the attaching and detaching hand 50 from a mounted state of the centering bracket 40 as shown in FIG. 27 and FIG. 28 will be explained.

The attaching and detaching hand 50, which is in an opened state, is lowered from above (above in FIG. 27), and the abutment surface 56a of the abutment member 56 is made to abut to the top surface of the centering bracket 40, and the attaching and detaching hand 50 is closed. Consequently, an inner surface 53b of one of the chuck pads 53 and the side surface of the bracket 41 abut to each other, and the taper surfaces 53a and 53a of the other chuck pad 53 and the taper surfaces 45 and 45 abut to each other, whereby the chuck pad 53 and the centering bracket 40 are positioned. Further, taper surfaces of the hook parts 55 and 55 of both the chuck pads 53 of the attaching and detaching hand 50 press the taper surfaces 36 and 36 of a pair of operating pieces 35 and 35 of the lock means 30 and 30 (at the side of the raising and lowering device 21 of the centering devices 3a and 3b, or the side of the pallet for the attachment) as shown in FIG. 28 and FIG. 29. As a result, both the operating pieces 35 and 35 are moved in the direction to be away from each other against a biasing force of the spring 34, and therefore both the locking members 37 and 37 are opened to disengage the locking pin 43 provided at the undersurface parts of the centering devices 3a and 3b from the reduced diameter part 43a. If the attaching and detaching hand 50 is raised in this state, the locking pin 43 is removed from the lock means 30 and 30, and the centering bracket 40 is held by the attaching and detaching hand 50. The hook parts 55 and 55 catch the bracket 41 on its undersurface, whereby the centering bracket 40 can be lifted with reliability.

Next, an operation performed when the centering bracket 40 is mounted at a predetermined position of the centering devices 3a and 3b or the pallet for the attachment from a state in which the centering bracket 40 is gripped with the attaching and detaching hand 50 will be explained. The attaching and detaching hand 50 is lowered, and the locking pin 43 at the undersurface part of the centering bracket 40 is inserted between the locking members 37 and 37 of the left and right locking means 30 and 30, which are attached at the raising and lowering device 21 of the centering devices 3a and 3b, or at the pallet for the attachment. As the taper part 43b of the head portion of the locking pin 43 is lowered, the locking members 37 and 37 are gradually pressed to open against the biasing force of the springs 34, and both the locking members 37 and 37 are fitted onto the reduced diameter part 43a of the locking pin 43 to be engaged with it by the biasing force of the spring 34. At this point of time, lowering of the attaching and detaching hand 50 is stopped, and is raised after the attaching and detaching hand 50 is opened. Thus, mounting of the centering bracket 40 to the raising and lowering device 21 or housing of the centering bracket 40 into the pallet is completed.

According to the control constitution block diagram shown in FIG. 2, the control constitution of the work loading apparatus will be explained. FIG. 2 is the same control constitution as in the first and second embodiments, and the points different from the control constitution in the second embodiment will be explained. In the second embodiment, the controller 10 automatically controls the setup of replacement of the attachments of the centering bracket 22 and each of the robots 4a to 4d and the like, but the objects in the third embodiment are the centering bracket 40 and each of the robots 4a to 4d. In the third embodiment, the robot controllers 11a to 11d input the setup data corresponding to the work W from the controller 10, and control the respective robots 4a to 4d based on the operation program corresponding to the setup data. At this time, the operation program is constituted by a program of taking out the attachment (the work holding attachments for the robots, and the centering brackets 40 mounted with the respective nest 20, of the centering devices 3a and 3b) corresponding to the work W from the corresponding pallet 6 to mount it at a predetermined position, a program of performing a predetermined work loading operation, and a program of housing the used attachment into the pallet 6.

Figure 35:
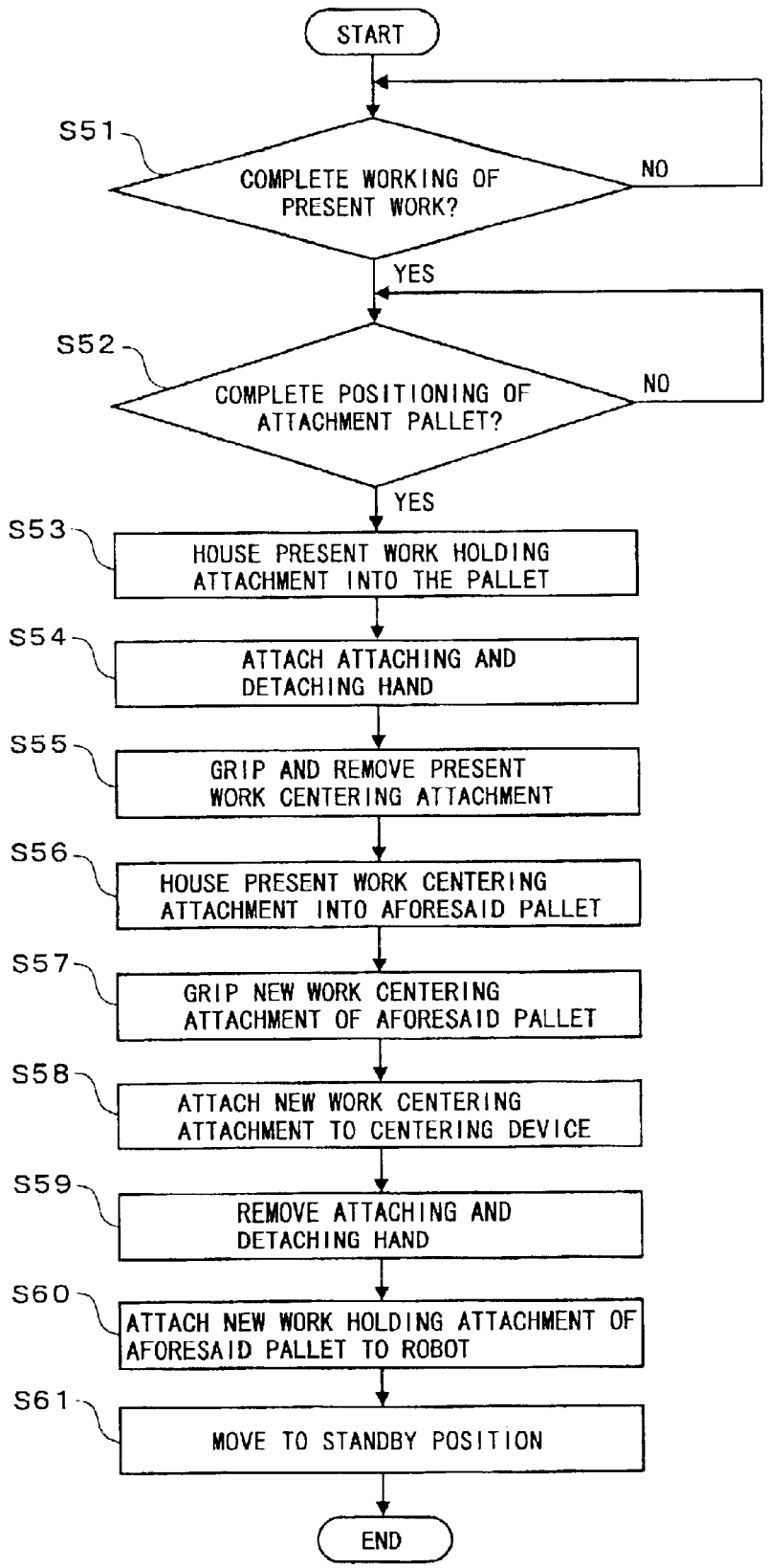
FIG. 35 is a control flow chart according to the third embodiment.
Figure 36:
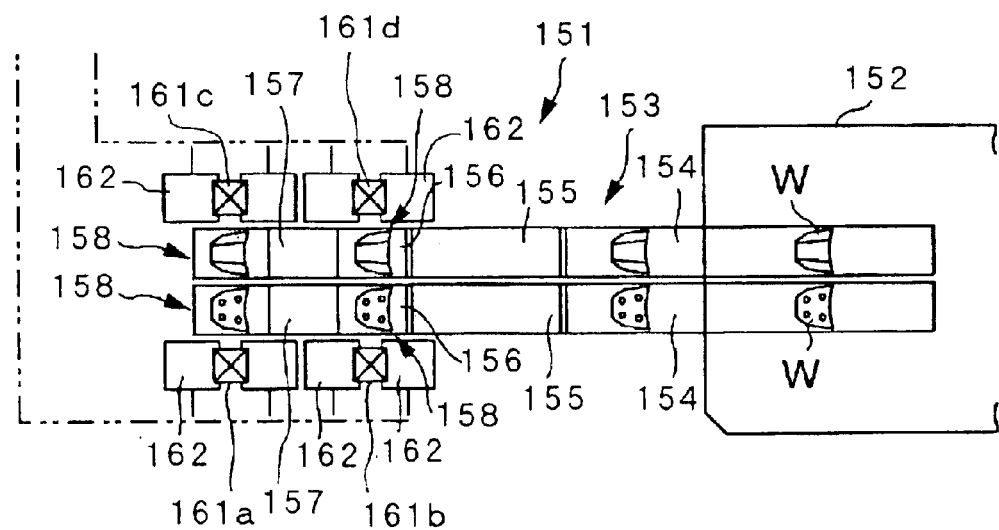
FIG. 36 is a plan view of a conventional automatic palletizer apparatus-cum-work loading apparatus.
Figure 37:
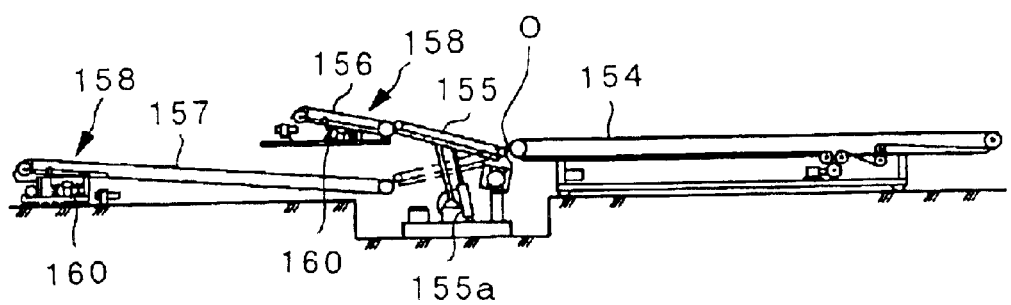
FIG. 37 is a side view of the automatic palletizer apparatus-cum-work loading apparatus in FIG. 36.
Figure 38:
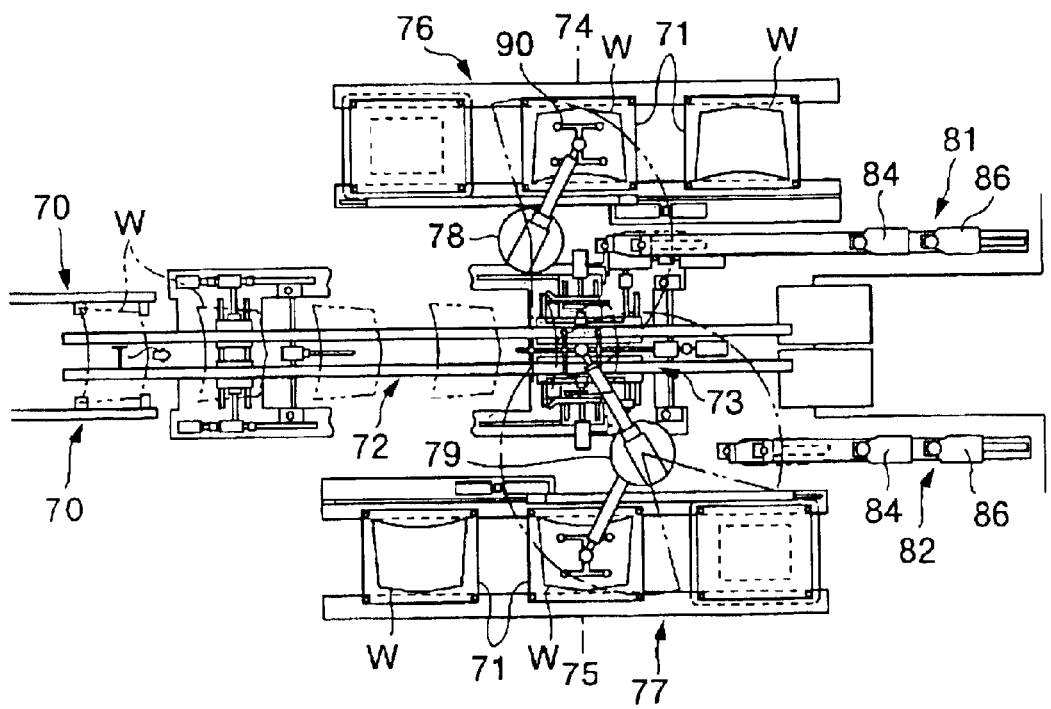
FIG. 38 is a plan view of a work loading apparatus of a prior art.
Figure 39:
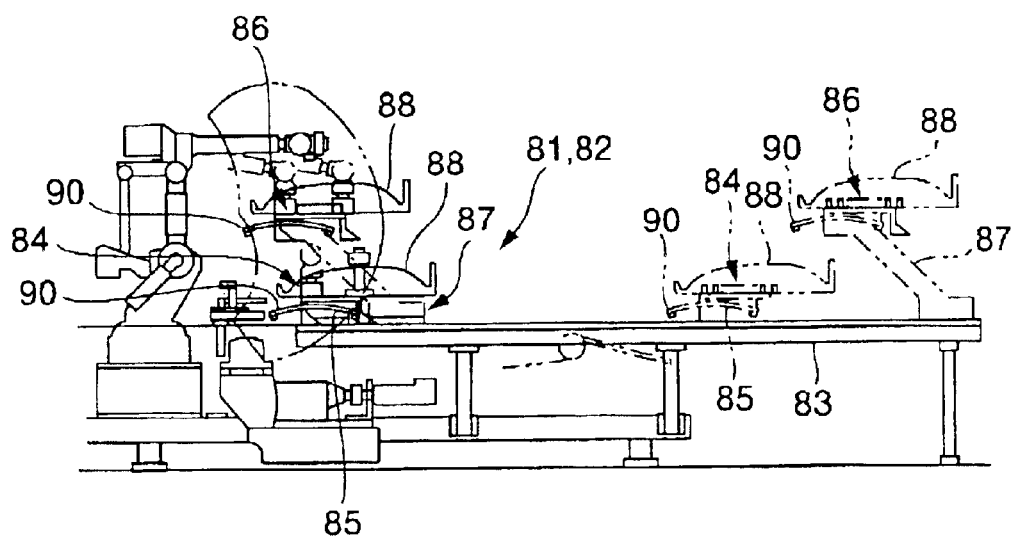
FIG. 39 is a side view of a conventional replacing apparatus for a conventional attachment.
Figure 40:
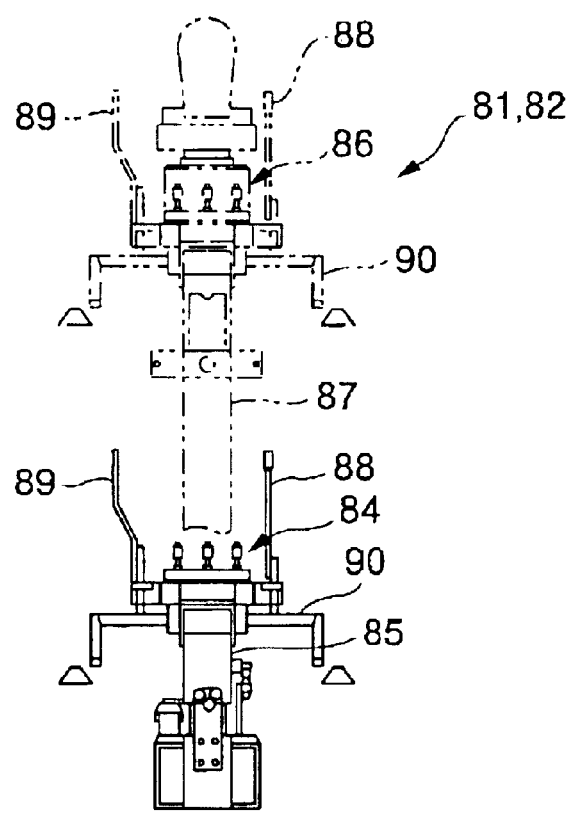
FIG. 40 is a front view of the replacing apparatus for an attachment in FIG. 39.

Next, a robot control procedure at the time of replacement of the attachments according to the above constitution will be explained based on a flowchart shown in FIG. 35. First, in step S51, it is determined whether working of the present work is completed, and a command is given to wait until it is completed. After the completion, in step S52, it is checked whether the pallet feeder 8 loaded with the pallet 6 for the attachment completes positioning of the pallet 6 at a predetermined station, and a command is given to be on standby until the completion of positioning is completed. After positioning is completed, in step S53, each of the robots 4a to 4d is moved to the pallet for the attachment, and the present work holding attachment of each of the robots 4a to 4d is housed in the pallet for the attachment. Next, in step S54, each of the robots 4a to 4d is moved to the housing position for the attaching and detaching hand 50 of the centering attachment, and the attaching and detaching hand 50 is attached to each of the robots. Next, in step S55, each of the robots 4a to 4d is moved to the centering devices 3a and 3b, and the centering bracket 40 mounted with the attachment for the centering devices 3a and 3b for the present work is gripped and lifted up with the attaching and detaching hand 50 as described above. Thereafter, in step S56, the gripped centering bracket 40 is housed in the aforementioned pallet for the attachment.

Next, in step S57, the centering brackets 40 mounted with the attachments for the centering devices 3a and 3b for the new work, which are placed on the pallet for the attachment, are gripped and lifted up with the attaching and detaching hands 50. After they are lifted up, in step S58, the centering brackets 40 for the centering devices 3a and 3b for the new work are attached to the centering devices 3a and 3b. In step S59, the attaching and detaching hand 50 are returned into the original housing position. In step S60, the attachment for holding the new work for the robot, which is placed on the pallet for the attachment is attached to each of the robots 4a to 4d. After the attachment, in step S61, each of the robots 4a to 4d is moved to the standby position and it is kept on standby until the new work W is transferred from the press.

According to the third embodiment, the following effects are obtained. At least either the attachment for the robot, or the attachment for the centering devices, which needs to be replaced corresponding to the work, is placed on the pallet for the attachment. This pallet is transferred with the pallet feeder in the same manner as the pallet for loading the work, and at the time of replacement, these old and new attachments are detached and attached with the loading robot and placed on the pallet. Consequently, since exclusive attachment replacing device as in the prior art is not needed, the installation space for the entire work loading apparatus can be made smaller, and the production cost can be reduced.

Since each of the attachments is carried in and out with the pallet in the same manner as the work, when an operator performs off-line setup of the attachment according to the work, the operator can work at the same place as carrying-in and-out of the work, and therefore excellent operability is provided. Since a plurality of attachments having the positioning function of the centering device are attached at the same centering bracket, the attachments for the same centering device are integrated, and can be attached and detached by one operation, and therefore excellent operability is provided at the time of replacing the attachment, thus making it possible to reduce the time taken for set-up.

What is claimed is:

1. A work loading method of an automatic palletizer for loading works, which are carried out of a press, onto a pallet by a robot, said method comprising:
   positioning the works with two centering devices, a first one of said two centering devices being upstream of a second one of said two centering devices in a work transfer directions, every other press shot; and
   making pairs of two robots each, which are located diagonally from each other, out of four of said robots in total, two of which are on a left side and two of which are on a right side to oppose each other in the work transfer direction with said two centering devices between them, said two robots of each pair holding the works, which are on said two centering devices, and performing a loading operation of the works onto said pallets, each pair alternately holding the works and performing the loading operation each time said two centering devices position the works.

2. The work loading method of the automatic palletizer according to claim 1, further comprising:
   on performing work loading onto said pallet, outputting an interference area entry interlock signal of each said robot to an upper controller, and confirming interlock of prevention of interference between said robots via said upper controller.

3. The work loading method of the automatic palletizer according to claim 1,
   wherein while a first pair of said pairs of robots is under a holding operation of the works, a second pair of said pairs of robots one of (i) perform a loading operation of the works onto said pallets, and (ii) are on standby for entry into a work holding operation position; and wherein while said first pair of robots are under the loading operation of the works onto said pallets, said second pair of robots one of (i) perform the holding operation, and (ii) are on standby for entry into work loading positions.

4. The work loading method of the automatic palletizer according to claim 3, further comprising:

on performing work loading onto said pallet, outputting an interference area entry interlock signal of each said robot to an upper controller, and confirming interlock of prevention of interference between said robots via said upper controller.

5. The work loading method of the automatic palletizer according to claim 1; further comprising:

controlling a loading position of each of the works based on a number of the works already loaded onto said pallet before start of a work loading operation, and a number of works to be loaded onto said pallet by the work loading operation.

6. A work loading method, comprising:

positioning works, which are carried out of a press, with a plurality of centering devices located directly downstream of said press or a carrying-out conveyor attached to said press; and taking up the works, which are positioned by said plurality of centering devices every plurality of press cycles, to load them onto pallets by a plurality of pairs of loading robots, wherein each of said pairs of loading robots comprises a first loading robot located on a left side of said plurality of centering devices and a second loading robot arranged on a right side of said centering robots and diagonally to said first loading robot.

7. A work loading apparatus for loading a work, which is carried out of a press, onto a pallet, comprising:

a plurality of centering devices which are located directly downstream of said press or a carrying-out conveyor attached to said press; and a plurality of pairs of loading robots for taking up the works positioned by said centering devices to load them onto said pallets;

wherein each of said pairs of loading robots comprises a first loading robot located on a left side of said plurality of centering devices and a second loading robot arranged on a right side of said centering robots and diagonally to said first loading robot.

8. The work loading apparatus according to claim 7, wherein said loading robots are movable in substantially a horizontal direction along substantially a work transfer direction.

9. The work loading apparatus according to claim 7, wherein said pallets are placed on both sides of said centering devices.

10. An attachment replacing method of a work loading apparatus for positioning a work, which is carried out of a press, with a centering device and loading the positioned work onto a pallet with a robot, said attachment replacing method being for replacing at least one of an attachment for said centering device and an attachment for said robot according to the work, said method comprising:

housing at least one of a used attachment for the centering device and a used attachment for the robot onto at least one of a plurality of said pallets loaded on a pallet feeder which makes said pallets movable between a work loading position within a movable range of said robot and a predetermined position outside the movable range; and attaching at least one of an attachment for the centering device to be used next and an attachment for the robot to be used next, which is placed on one of the same pallet and a different pallet from the pallet housing said at least either one of said used attachment for the centering device and said used attachment for the robot, to a corresponding one of the centering device and the robot.

11. A work loading apparatus for positioning a work, which is carried out of a press, with a centering device, and loading the positioned work onto a pallet with a robot, comprising:

a pallet feeder which makes a plurality of said pallets movable between a work loading position within a movable range of said robot and a predetermined position outside the movable range;

wherein at least one of said pallets loaded on said pallet feeder houses at least one of a used attachment for the centering device and a used attachment for the robot; and wherein at least one of said pallets, which is one of the same pallet as and a different pallet from the pallet housing at least either one of said used attachment for the centering device or said used attachment for said robot, houses at least one of an attachment for the centering device to be used next and an attachment for the robot to be used next.

12. The work loading apparatus according to claim 11, wherein said centering device includes a centering bracket; and wherein a plurality of attachments for said centering device are attached to the same said centering bracket.

* * * * *